(12) United States Patent
Patel et al.

(10) Patent No.: US 8,793,982 B2
(45) Date of Patent: Aug. 5, 2014

(54) CONTROL SYSTEM FOR A TWO-STROKE LOCOMOTIVE DIESEL ENGINE HAVING AN EXHAUST AFTERTREATMENT SYSTEM

(75) Inventors: Ajay Patel, Joliet, IL (US); Gary R. Svihla, Burr Ridge, IL (US)

(73) Assignee: Electro-Motive Diesel Inc., LaGrange, IL (US)

( * ) Notice: Subject to any disclaimer, the term of this patent is extended or adjusted under 35 U.S.C. 154(b) by 607 days.

(21) Appl. No.: 13/173,990

(22) Filed: Jun. 30, 2011

(65) Prior Publication Data

US 2012/0079811 A1      Apr. 5, 2012

Related U.S. Application Data

(60) Provisional application No. 61/388,443, filed on Sep. 30, 2010.

(51) Int. Cl.
*F01N 3/00* (2006.01)

(52) U.S. Cl.
USPC ............... 60/295; 60/297; 60/301; 60/303; 60/311

(58) Field of Classification Search
CPC ....... F01N 3/2066; F01N 3/035; F01N 3/023; F01N 3/0253; F01N 3/106; F01N 3/2033; F01N 3/021; F01N 3/38; F01N 2610/02; F01N 2610/102; F01N 9/002; F01N 9/00; F01N 2240/14; F01N 2900/1606; F01N 2900/1808
USPC ............................. 60/295, 297, 301, 303, 311
See application file for complete search history.

(56) References Cited

U.S. PATENT DOCUMENTS

| | | | | |
|---|---|---|---|---|
| 5,067,320 | A * | 11/1991 | Kanesaki | 60/297 |
| 6,415,603 | B1 * | 7/2002 | Nowka et al. | 60/322 |
| 6,843,966 | B1 * | 1/2005 | Mahr | 422/172 |
| 8,069,655 | B2 * | 12/2011 | Carroll et al. | 60/286 |
| 8,511,068 | B2 * | 8/2013 | Tsujimoto et al. | 60/286 |
| 2002/0179726 | A1 * | 12/2002 | Baeuerle et al. | 237/69 |
| 2004/0112046 | A1 * | 6/2004 | Tumati et al. | 60/297 |
| 2004/0226291 | A1 * | 11/2004 | Diez et al. | 60/323 |
| 2006/0260297 | A1 * | 11/2006 | Koch | 60/286 |
| 2010/0031643 | A1 * | 2/2010 | Cox et al. | 60/295 |
| 2011/0126524 | A1 * | 6/2011 | Askew | 60/287 |
| 2011/0252788 | A1 * | 10/2011 | Kleinfeld | 60/602 |

(Continued)

FOREIGN PATENT DOCUMENTS

| | | |
|---|---|---|
| JP | 2010043563 | 2/2010 |
| KR | 1019980058725 | 10/1998 |
| WO | 2006124294 | 11/2006 |

*Primary Examiner* — Thomas Denion
*Assistant Examiner* — Patrick Maines

(57) ABSTRACT

The present application generally relates to a diesel engine and, more particularly, to a control system and method for an exhaust aftertreatment system for a locomotive diesel engine. In accordance with an embodiment of the present system, a two-stroke uniflow scavenged diesel engine system including an exhaust aftertreatment system is described for reducing $NO_X$ emissions and achieving desired fuel economy. More specifically, a system and method for controlling the exhaust aftertreatment system is provided. The present system being adapted to monitor and control select components of the exhaust aftertreatment system. Specifically, the control system may be adapted to control select components of an exhaust aftertreatment system to adaptively regulate filtration based on various operating conditions of the locomotive.

13 Claims, 34 Drawing Sheets

(56) References Cited

U.S. PATENT DOCUMENTS

| | | |
|---|---|---|
| 2012/0042632 A1* | 2/2012 | Inoue .......................... 60/274 |
| 2012/0067331 A1* | 3/2012 | Pipis et al. .................. 123/564 |
| 2012/0315192 A1* | 12/2012 | Tsujimoto .................... 422/109 |
| 2013/0041571 A1* | 2/2013 | Nogi ............................ 701/103 |
| 2013/0055711 A1* | 3/2013 | Hofer et al. .................. 60/602 |

* cited by examiner

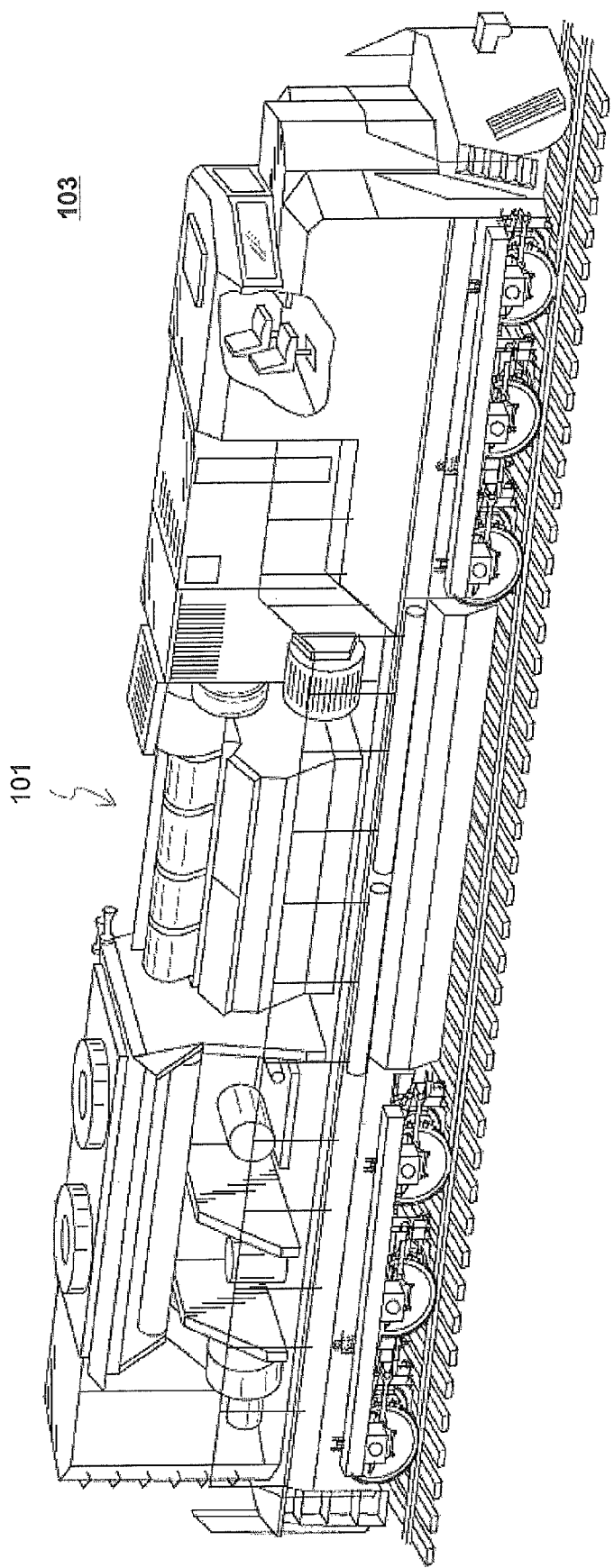

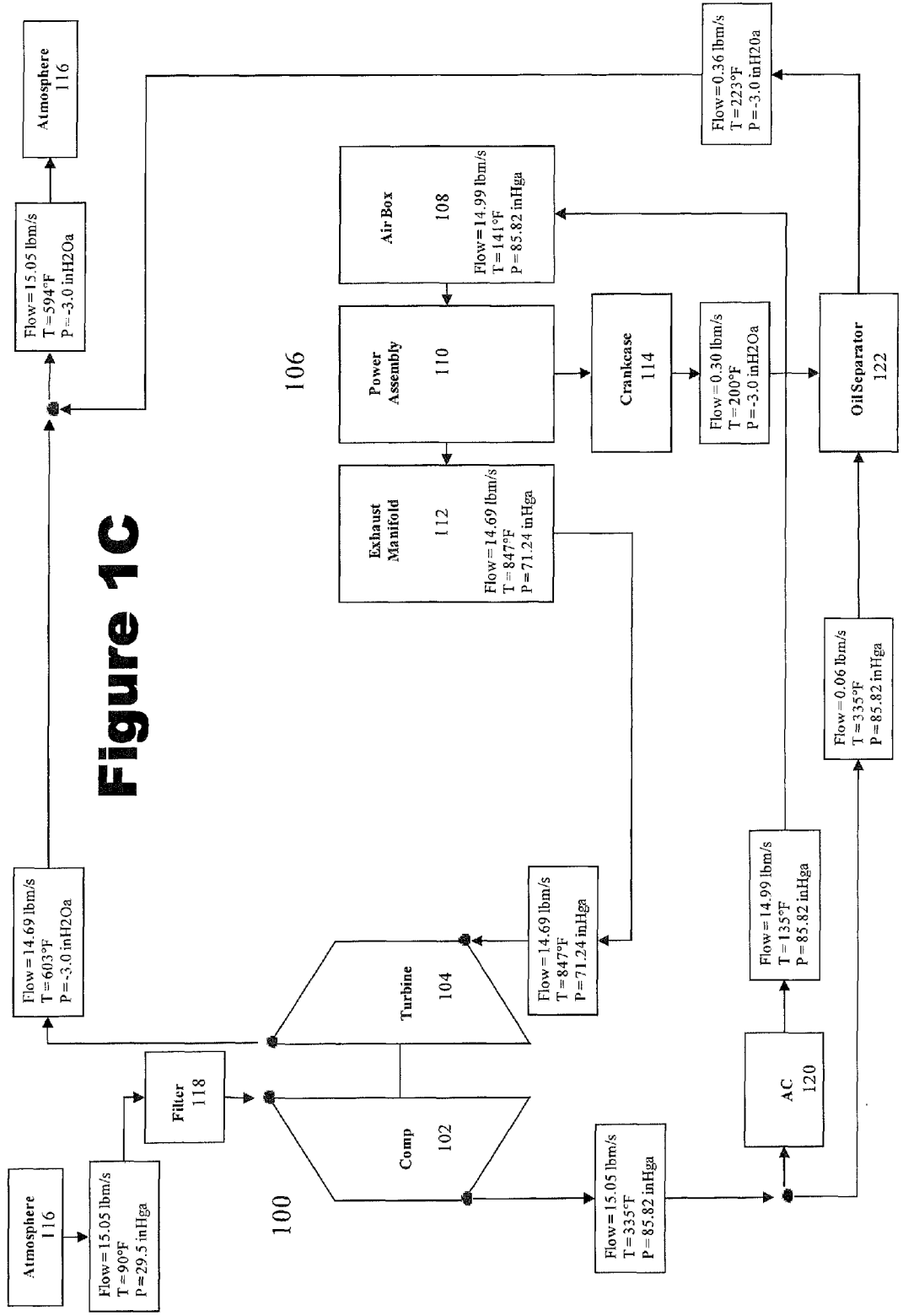

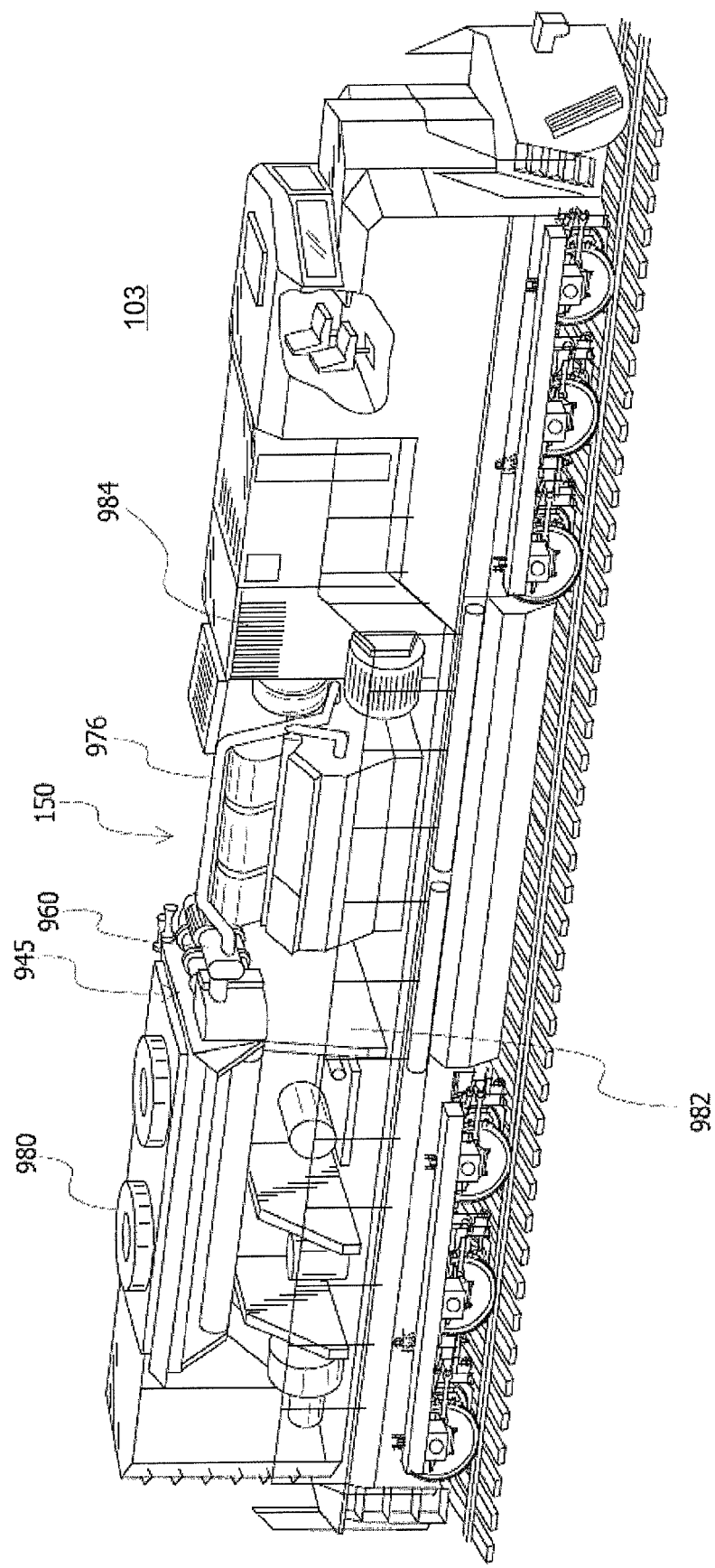

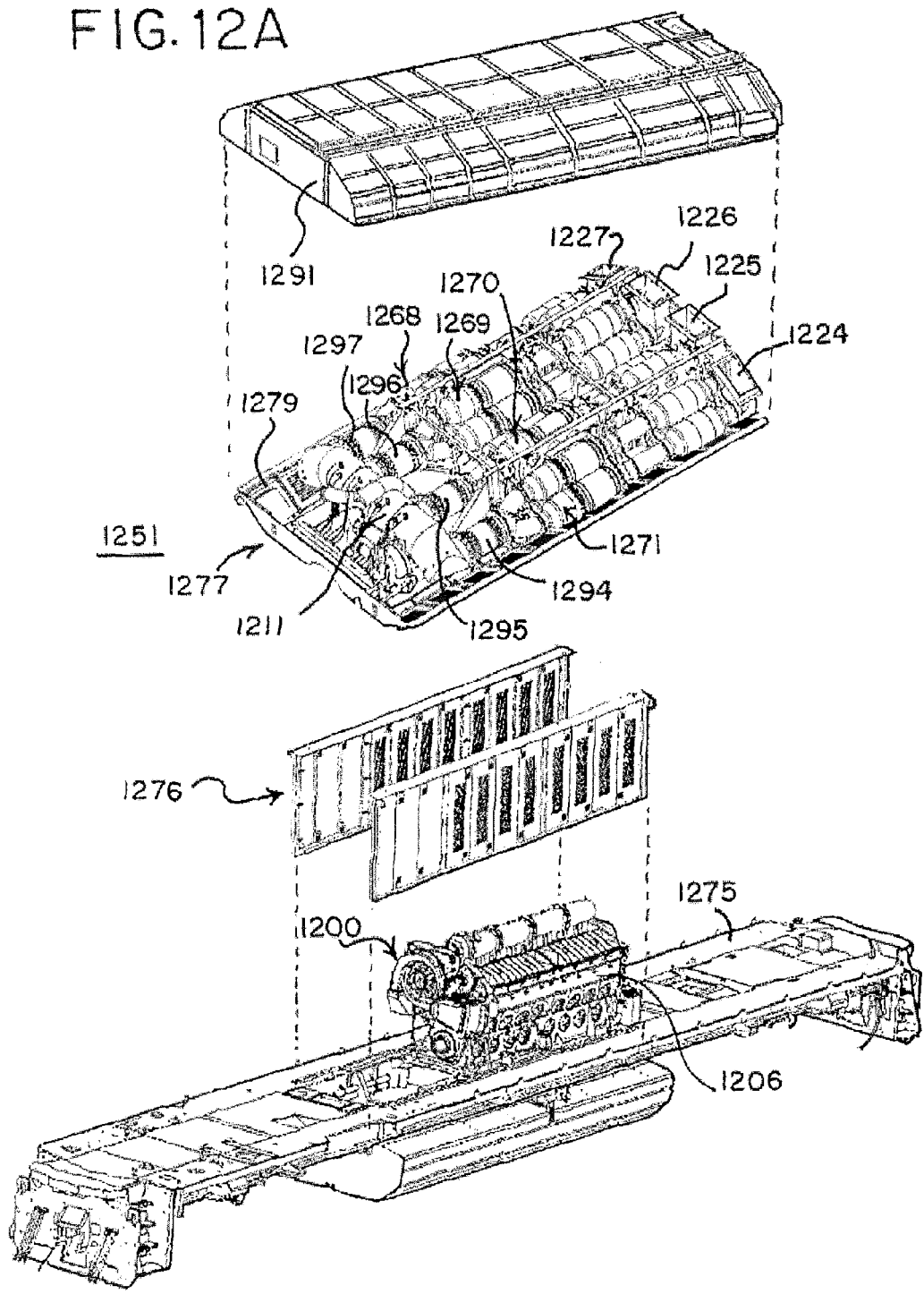

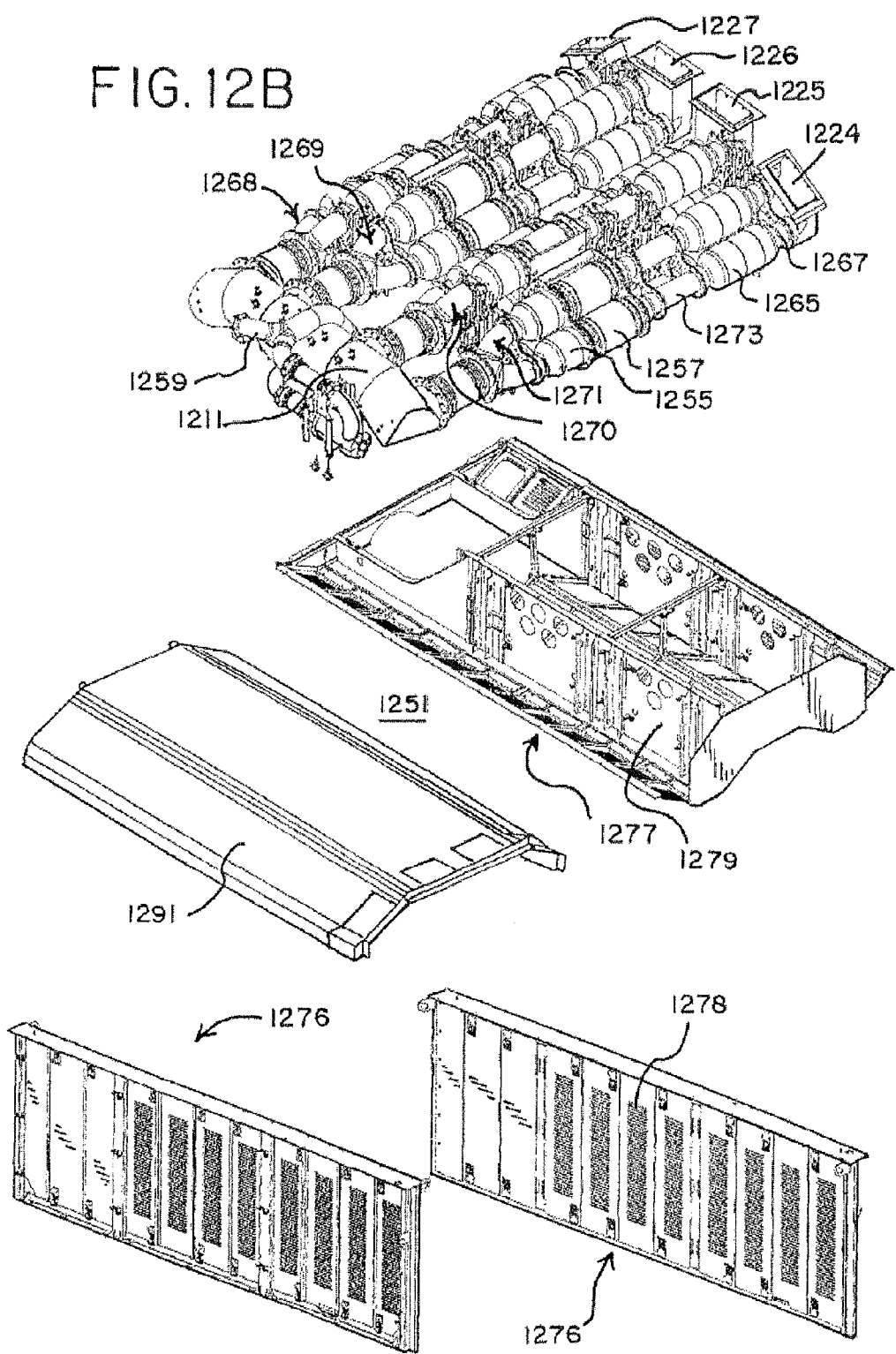

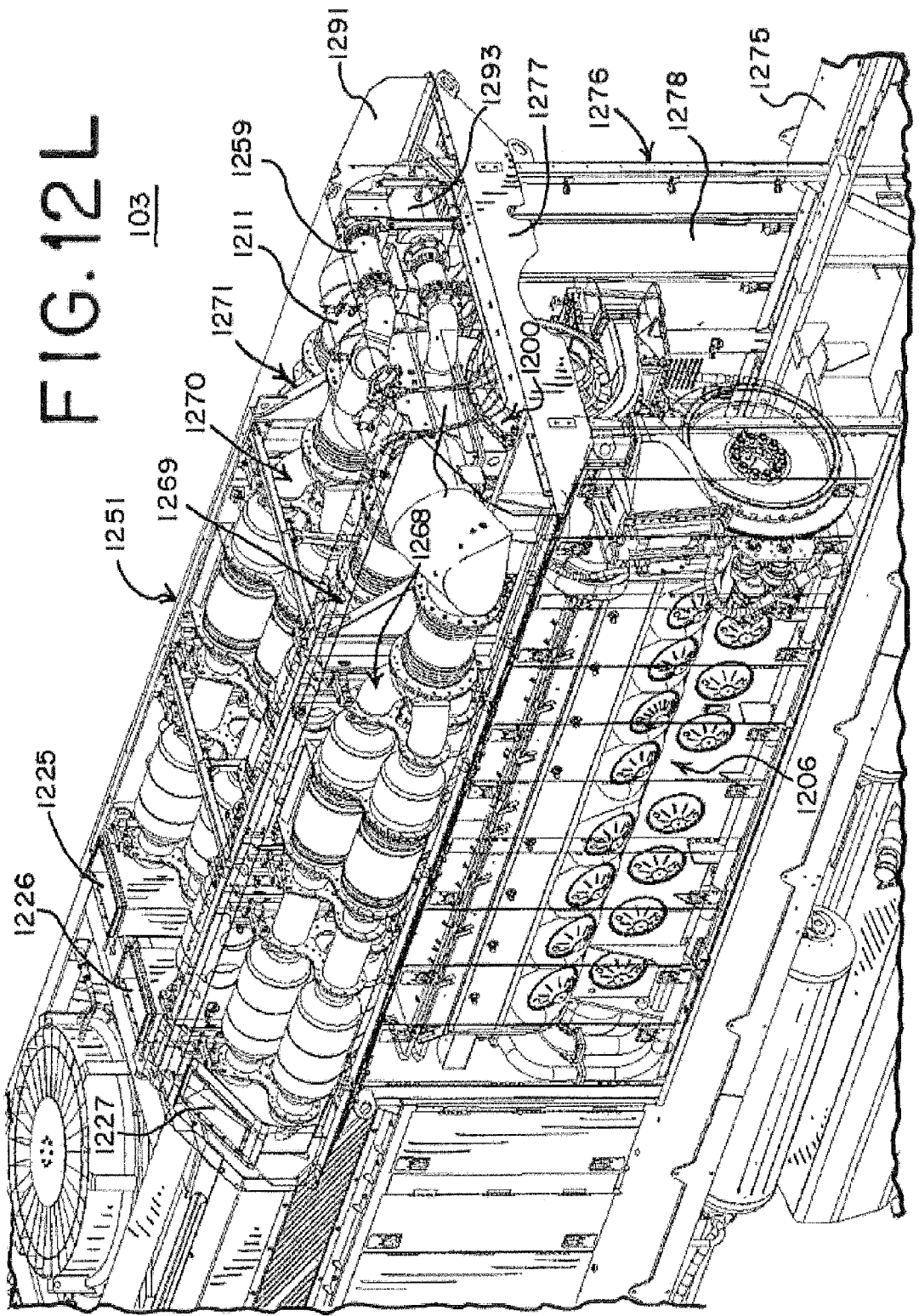

CONTROL SYSTEM FOR A TWO-STROKE LOCOMOTIVE DIESEL ENGINE HAVING AN EXHAUST AFTERTREATMENT SYSTEM

CROSS-REFERENCE TO RELATED APPLICATIONS

This application is a Nonprovisional Patent Application, which claims benefit to U.S. Provisional Application Ser. No. 61/388,443, entitled "Exhaust Aftertreatment System for a Locomotive," filed Sep. 30, 2010, the complete disclosure thereof being incorporated herein by reference.

TECHNICAL FIELD

This application relates to a locomotive diesel engine and, more particularly, to a system and method for controlling or an exhaust aftertreatment system for a locomotive diesel engine.

BACKGROUND OF THE DISCLOSURE

The present application generally relates to a locomotive diesel engine and, more specifically, to a system and method for controlling an exhaust aftertreatment system for a locomotive diesel engine. The present exhaust aftertreatment systems may be implemented with a locomotive two-stroke uniflow scavenged diesel engine.

FIG. 1a illustrates a locomotive 103 including a conventional uniflow two-stroke diesel engine system 101. As shown in FIGS. 1b and 1c, the locomotive diesel engine system 101 of FIG. 1a includes a conventional air system. Referring concurrently to both FIGS. 1b and 1c, the locomotive diesel engine system 101 generally comprises a turbocharger 100 having a compressor 102 and a turbine 104, which provides compressed air to an engine 106 having an airbox 108, power assemblies 110, an exhaust manifold 112, and a crankcase 114. In a typical locomotive diesel engine system 101, the turbocharger 100 increases the power density of the engine 106 by compressing and increasing the amount of air transferred to the engine 106.

More specifically, the turbocharger 100 draws air from the atmosphere 116, which is filtered using a conventional air filter 118. The filtered air is compressed by a compressor 102. The compressor 102 is powered by a turbine 104, as will be discussed in further detail below. A larger portion of the compressed air (or charge air) is transferred to an aftercooler 120 (or otherwise referred to as a heat exchanger, charge air cooler, or intercooler) where the charge air is cooled to a select temperature. Another smaller portion of the compressed air is transferred to a crankcase ventilation oil separator 122, which evacuates the crankcase 114 in the engine; entrains crankcase gas; and filters entrained crankcase oil before releasing the mixture of crankcase gas and compressed air into the atmosphere 116.

The cooled charge air from the aftercooler 120 enters the engine 106 via an airbox 108. The decrease in charge air intake temperature provides a denser intake charge to the engine, which reduces $NO_X$ emissions while improving fuel economy. The airbox 108 is a single enclosure, which distributes the cooled air to a plurality of cylinders. The combustion cycle of a diesel engine includes, what is referred to as, scavenging and mixing processes. During the scavenging and mixing processes, a positive pressure gradient is maintained from the intake port of the airbox 108 to the exhaust manifold 112 such that the cooled charge air from the airbox 108 charges the cylinders and scavenges most of the combusted gas from the previous combustion cycle.

More specifically, during the scavenging process in the power assembly 110, the cooled charge air enters one end of a cylinder controlled by an associated piston and intake ports. The cooled charge air mixes with a small amount of combusted gas remaining from the previous cycle. At the same time, the larger amount of combusted gas exits the other end of the cylinder via four exhaust valves and enters the exhaust manifold 112 as exhaust gas. The control of these scavenging and mixing processes is instrumental in emissions reduction as well as in achieving desired levels of fuel economy.

Exhaust gases from the combustion cycle exit the engine 106 via an exhaust manifold 112. The exhaust gas flow from the engine 106 is used to power the turbine 104 of the turbocharger 100, and thereby power the compressor 102 of the turbocharger 100. After powering the turbine 104, the exhaust gases are released into the atmosphere 116 via an exhaust stack 124 or silencer.

The exhaust gases released into the atmosphere by a locomotive diesel engine include particulates, nitrogen oxides ($NO_X$) and other pollutants. Legislation has been passed to reduce the amount of pollutants that may be released into the atmosphere. Traditional systems have been implemented which reduce these pollutants, but at the expense of fuel efficiency. Accordingly, it is an object of the present disclosure to provide an exhaust aftertreatment system, which reduces the amount of pollutants (e.g., particulates, nitrogen oxides ($NO_X$) and other pollutants) released by the diesel engine while achieving desired fuel efficiency.

The various embodiments of the present aftertreatment system are able to exceed, what is referred in the industry as, the Environmental Protection Agency's (EPA) Tier II (40 CFR 92), Tier III (40 CFR 1033), and Tier IV (40 CFR 1033) emission requirements, as well as the European Commission (EURO) Tier IIIb emission requirements. These various emission requirements are cited by reference herein and made a part of this patent application.

SUMMARY OF THE DISCLOSURE

The present disclosure generally relates to a diesel engine and, more particularly, to a control system and method for an exhaust aftertreatment system for a locomotive diesel engine. In accordance with an embodiment of the present system, a two-stroke uniflow scavenged diesel engine system including an exhaust aftertreatment system is described for reducing $NO_X$ emissions and achieving desired fuel economy.

A system and method for controlling the exhaust aftertreatment system is provided. The present system being adapted to monitor and control select components of the exhaust aftertreatment system. Specifically, the control system may be adapted to control select components of an exhaust aftertreatment system to adaptively regulate filtration based on various operating conditions of the locomotive.

In accordance with an embodiment of the disclosure, an exhaust aftertreatment system for a locomotive is described for reducing pollutants. This system generally includes a manifold adapted to receive exhaust from the locomotive engine and stabilize the exhaust from the locomotive engine; a filtration system coupled to the manifold including a catalyst and filter adapted to filter particulate matter, hydrocarbons and carbon monoxide from the exhaust; and a $NO_X$ reduction system situated inline with the filtration system adapted to reduce $NO_X$ from the exhaust.

According to various aspects of the present disclosure, the exhaust aftertreatment system may include various additional features. In one embodiment, the exhaust aftertreatment system includes a filtration injection system adapted to add fuel to the exhaust in the manifold, where the manifold is sized and shaped to promote mixing of the exhaust and fuel contained therein. Specifically, the fuel in this mixture reacts with oxygen in the presence of the catalyst, increasing the temperature of the exhaust, and thereby promoting oxidation of soot on the filter in the filtration system. The filtration system may be comprised of a diesel oxidation catalyst (DOC) or a diesel particulate filter (DPF). A filtration control system is also described for monitoring and controlling particulate buildup on the filter.

In another embodiment, the $NO_X$ reduction system may include a selective catalytic reduction (SCR) catalyst and an ammonia slip catalyst (ASC). A $NO_X$ reduction control system is also described for monitoring and controlling the $NO_X$ reduction system. A $NO_X$ reduction system injection system may further be provided to add a $NO_X$ reduction reagent to the exhaust. The $NO_X$ reduction system injection system is preferably situated upstream of the $NO_X$ reduction system.

In yet another embodiment, the exhaust aftertreatment system may further include a heating device situated with respect to the manifold for heating the exhaust and a control system for the heating device.

Various embodiments of an exhaust aftertreatment system are shown and described which may operate within a locomotive operating environment and be placed within the limited size constraints of the locomotive. In one embodiment, an exhaust aftertreatment system is shown and described having a filtration system situated inline with a $NO_X$ reduction system. In another embodiment, an exhaust aftertreatment system is shown having an integral housing having a filtration system and a $NO_X$ reduction system. Because exhaust from a locomotive engine is generally not uniform, the manifold may be sized and shaped to uniformly distribute the exhaust to the filtration system. For example, the manifold may be sized and shaped such that the exhaust enters a volume greater than the volume at which exhaust is expelled from the engine.

According to another aspect of the present disclosure, an exhaust aftertreatment system is provided for a locomotive, which includes a support system and a connection system to the locomotive engine and structure. The exhaust aftertreatment system includes a manifold coupled to an exhaust outlet of the locomotive engine and an emissions reduction system flexibly coupled to the manifold to isolate operational loads of the engine from the locomotive. In one example, a support structure is provided such that the mass load of the exhaust aftertreatment system is supported by the locomotive via the support structure. In another example, a connection system is provided to permit the exhaust aftertreatment system to move relative to its loads and account for thermal expansion.

These exhaust aftertreatment systems may be used in conjunction with various exhaust gas recirculation systems (including those described herein) to further reduce exhaust emissions from the engine.

BRIEF DESCRIPTION OF THE DRAWINGS

FIG. 1a is a perspective view of a locomotive including a two-stroke diesel engine system.

FIG. 1b is a partial cross-sectional perspective view of the two-stroke diesel engine system of FIG. 1a.

FIG. 1c is a system diagram of the two-stroke diesel engine of FIG. 1b having a conventional air system.

FIG. 9a is a perspective view of a locomotive including a two-stroke diesel engine system with an EGR system in accordance with an embodiment of the present disclosure.

FIG. 9b is a partial cross-sectional perspective view of the two-stroke diesel engine system with an EGR system of FIG. 9a.

FIG. 9c is a top view of the two-stroke diesel engine system with an EGR system of FIG. 9a.

FIG. 9e is a perspective view of an embodiment of an EGR module for use with the EGR system of FIG. 9a.

FIG. 12a is an exploded perspective view of an embodiment of an exhaust aftertreatment system in accordance with the present system.

FIG. 12b is another perspective view of the embodiment of the exhaust aftertreatment system of FIG. 12a.

FIG. 12c is a bottom perspective view of the embodiment of the exhaust aftertreatment system of FIG. 12a.

FIG. 12d is a top view of the embodiment of the exhaust aftertreatment system of FIG. 12a.

FIG. 12e is a top perspective view of the embodiment of the exhaust aftertreatment system of FIG. 12a.

FIG. 12*l* is a partial cross-sectional perspective view of a locomotive including the exhaust aftertreatment system of FIG. 12*a*.

DETAILED DESCRIPTION OF THE DRAWINGS

The present system is directed to a control system for a uniflow two-stroke locomotive diesel engine having an exhaust aftertreatment system for a locomotive diesel engine to reduce pollutants, namely particulate matter and $NO_X$ emissions released from the engine. The present exhaust aftertreatment system may be further implemented in conjunction with an exhaust gas recirculation (EGR) system which enhances the unique scavenging and mixing processes of a locomotive uniflow two-stroke diesel engine in order to further reduce $NO_X$ emissions while achieving desired fuel economy.

The present system may further be enhanced by adapting the various engine parameters, the EGR system parameters, and the exhaust aftertreatment system parameters. For example, as discussed above, emissions reduction and achievement of desired fuel efficiency may be accomplished by maintaining or enhancing the scavenging and mixing processes in a uniflow two-stroke diesel engine (e.g., by adjusting the intake port timing, intake port design, exhaust valve design, exhaust valve timing, EGR system design, engine component design and turbocharger design).

The various embodiments of the present disclosure may be applied to locomotive two-stroke diesel engines having various numbers of cylinders (e.g., 8 cylinders, 12 cylinders, 16 cylinders, 18 cylinders, 20 cylinders, etc.). The various embodiments may further be applied to other two-stroke uniflow scavenged diesel engine applications other than for locomotive applications (e.g., marine applications). The various embodiments may also be applied to other types of diesel engines (e.g., four-stroke diesel engines).

A control system for the exhaust aftertreatment system is provided which monitors and controls select components of any of the exhaust aftertreatment systems of the embodiments described below, or other similar exhaust aftertreatment systems. Specifically, the control system may be adapted to control select components of an exhaust aftertreatment system to adaptively regulate filtration based on various operating conditions of the locomotive.

Figure 1B:
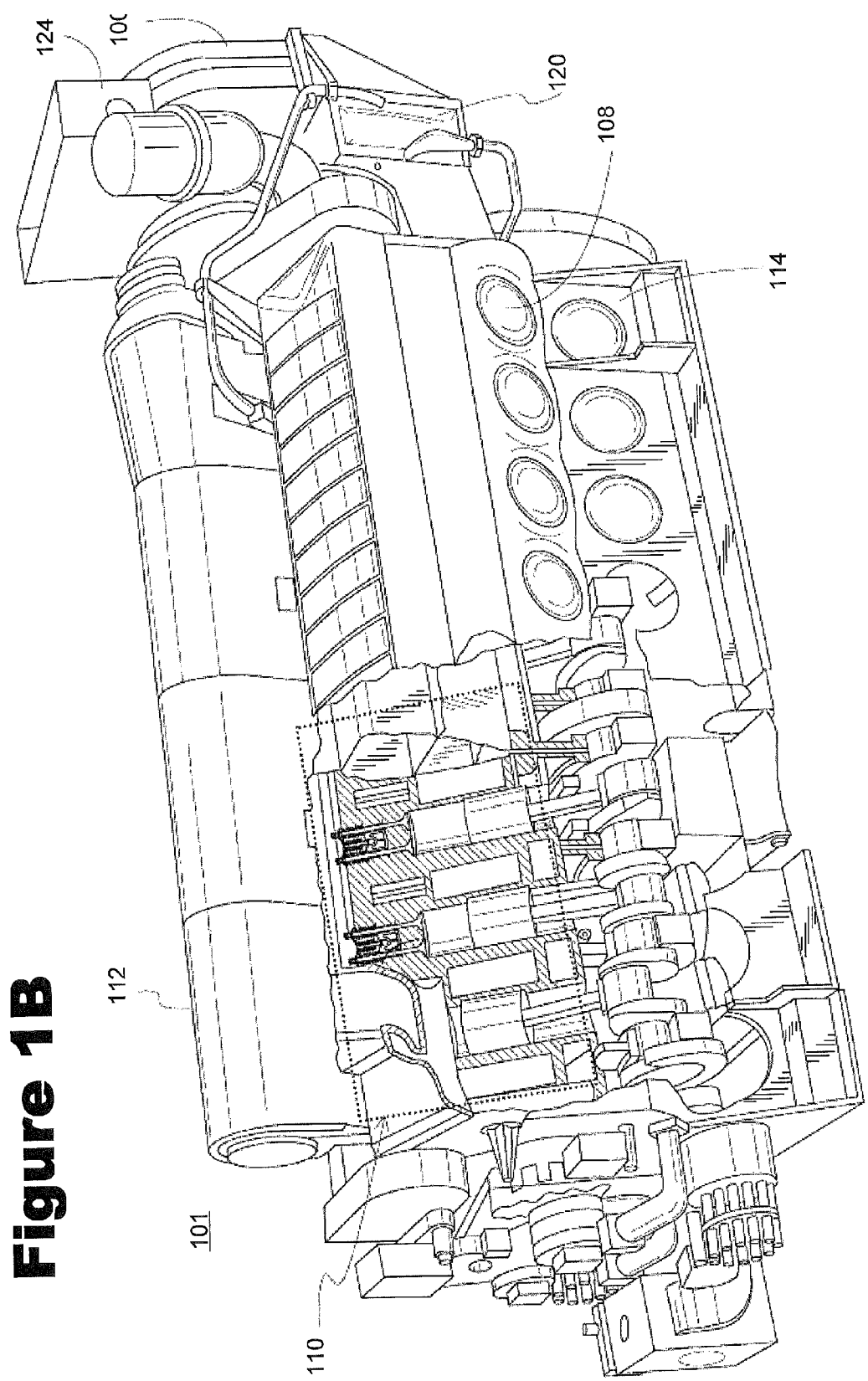
Figure 2A:
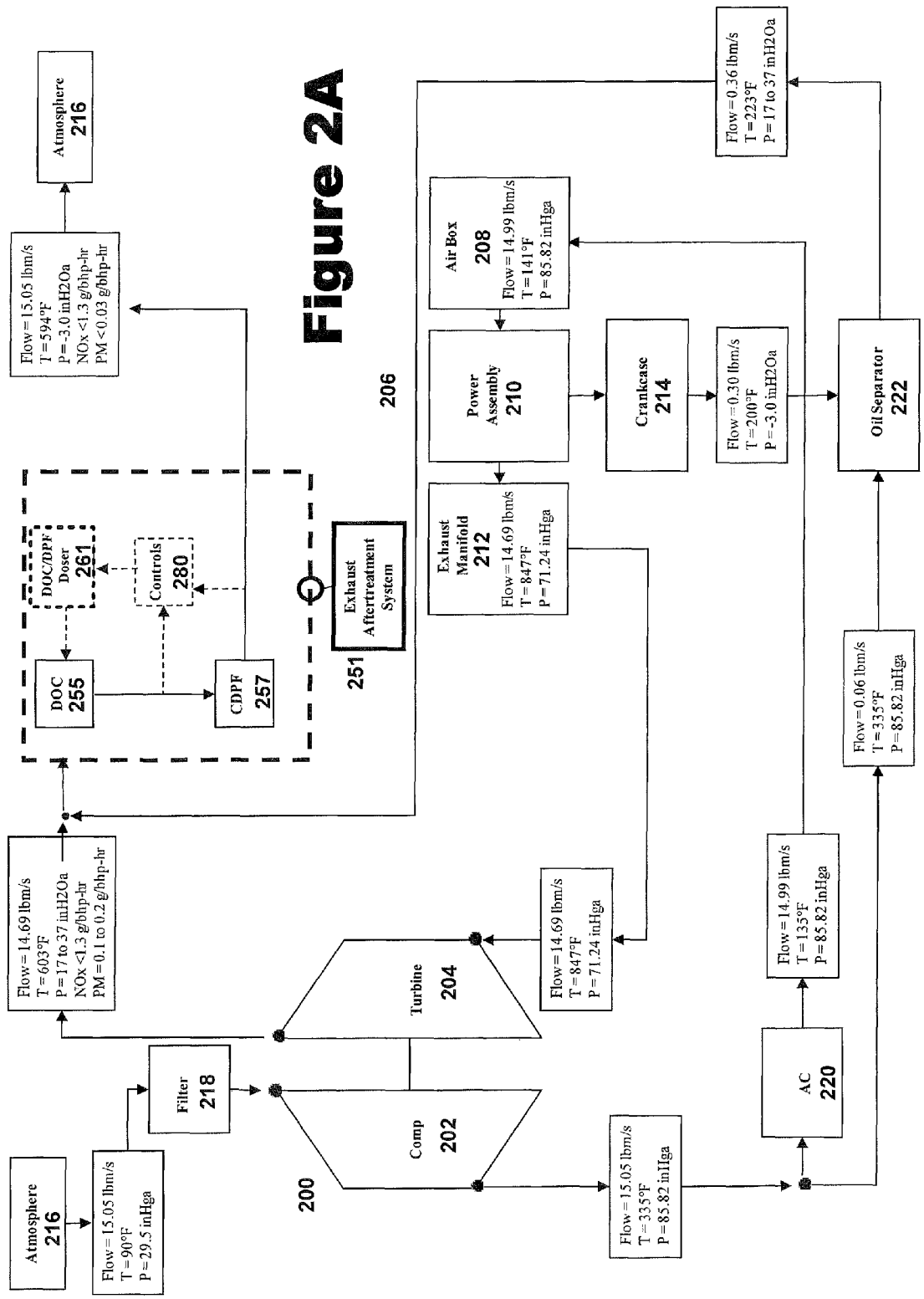
FIG. 2a is a system diagram of a two-stroke diesel engine having an exhaust aftertreatment system.

As shown in FIG. 2*a*, the present system may include an exhaust aftertreatment system 251 for reducing particulate matter (PM), hydrocarbons and/or carbon monoxide emissions from the exhaust manifold 212 of the engine 206. In this system, the engine 206 may be adapted to have reduced $NO_X$ emissions (e.g., less than 1.3 g/bhp-hr). In order to reduce further emissions from the exhaust, the exhaust aftertreatment system 251 generally includes a filtration system 255/257 to filter other emissions including particulate matter from the exhaust. More specifically, the exhaust aftertreatment system 251 may include a diesel oxidation catalyst (DOC) 255 and a diesel particulate filter (DPF) 257. The DOC 255 uses an oxidation process to reduce the particulate matter (PM), hydrocarbons and/or carbon monoxide emissions in the exhaust gases. The DPF 257 includes a filter to reduce PM and/or soot from the exhaust gases. The DOC/DPF 255/257 arrangement may be adapted to passively regenerate and oxidize soot. Although a DOC 255 and DPF 257 are shown, other comparable filters may be used.

A filtration control system 280 may be provided, which monitors and maintains the cleanliness of the DPF 257. In another embodiment, a control system 280 determines and monitors the pressure differential across the DPF 257 using pressure sensors. As discussed above, the DOC/DPF arrangement 255/257 may be adapted to passively regenerate and oxidize soot within the DPF 257. However, the DPF 257 will accumulate ash and some soot, which must be removed in order to maintain the DPF efficiency. As ash and soot accumulate, the pressure differential across the DPF 257 increases. Accordingly, the control system 280 monitors and determines whether the DPF 257 has reached a select pressure differential at which the DPF 257 requires cleaning or replacement. In response thereto, the control system 280 may signal an indication that the DPF 257 requires cleaning or replacement.

Alternatively, a control system 280 is shown to be coupled to a DOC/DPF doser 261 (e.g., a hydrocarbon injector), which adds fuel onto the catalyst for the DOC/DPF arrangement 255/257 for active regeneration of the filter. The fuel reacts with oxygen in the presence of the catalyst, which increases the temperature of the exhaust gas to promote oxidation of soot on the filter. In yet another embodiment, the control system 280 may be coupled to a heating device 293, which may be in the form of an optional burner or other heating element, for controlling the temperature of the exhaust gas to control oxidation of soot on the filter.

Figure 2B:
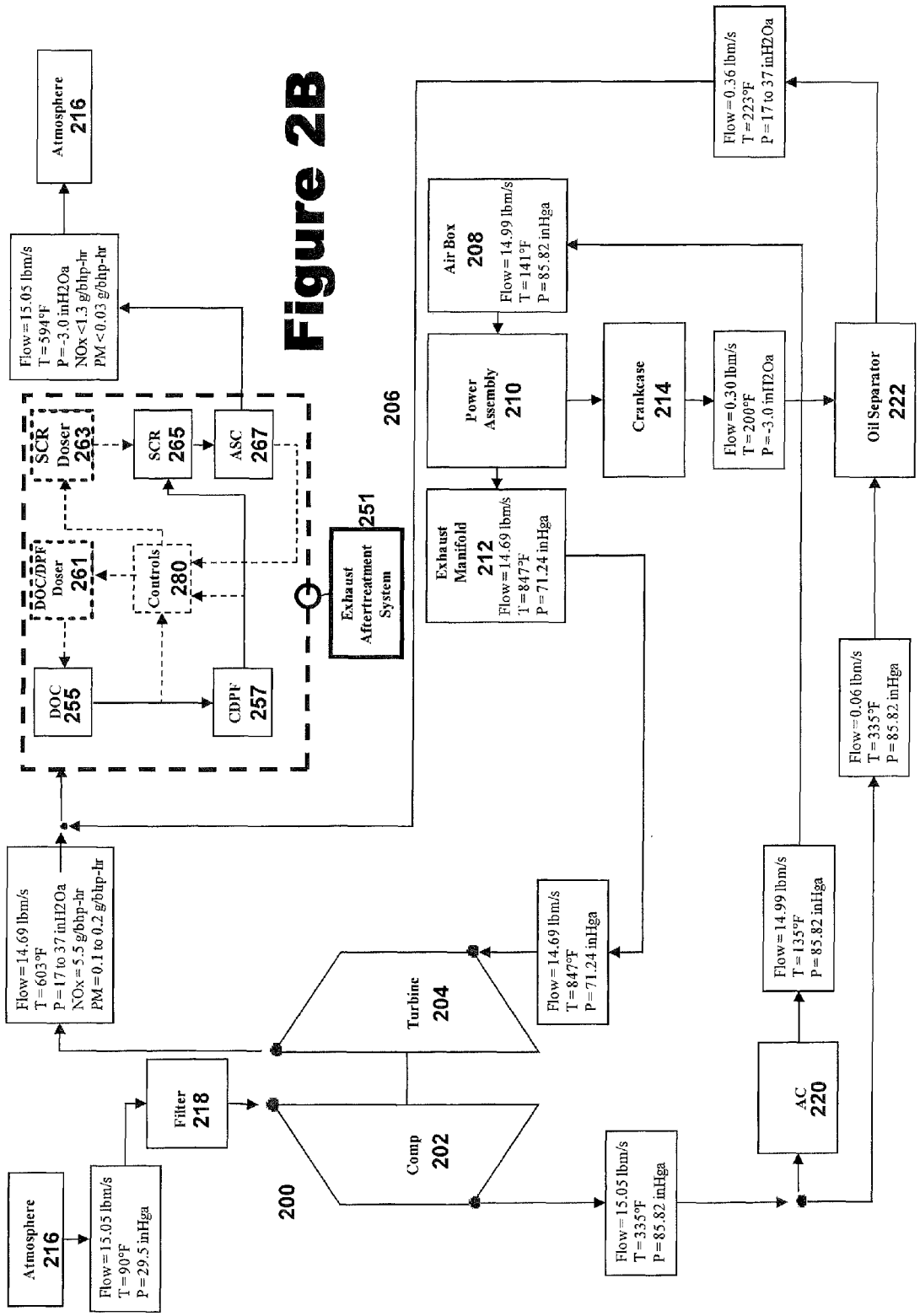
FIG. 2b is a system diagram of a two-stroke diesel engine having an exhaust aftertreatment system including a selective catalytic reduction catalyst and ammonia slip catalyst.

As shown in FIG. 2*b*, the present system may include an exhaust aftertreatment system 251 for reducing $NO_X$ emissions and the particulate matter (PM), hydrocarbons and/or carbon monoxide emissions released to the atmosphere 216. In this particular arrangement, the exhaust aftertreatment system 251 further includes a selective catalytic reduction (SCR) catalyst 265 and ammonia slip catalyst (ASC) 267 in addition to a filtration system 255/257 similar to that shown and described with respect to FIG. 2*a*. More specifically, the exhaust aftertreatment system 251 includes a diesel oxidation catalyst (DOC) 255, a diesel particulate filter (DPF) 257, a control system (for filtration) 280 and DOC/DPF doser 261 similar to that shown and described with respect to FIG. 2*a*. In yet another embodiment, the exhaust aftertreatment system 251 may further include a heating element in the form of an optional burner or other heating element for controlling the temperature of the exhaust gas to control oxidation of soot on the filter.

Additionally, the exhaust aftertreatment system 251 of FIG. 2*b* further includes a selective catalytic reduction (SCR) catalyst 265 and ammonia slip catalyst (ASC) 267 adapted to lower $NO_X$ emissions of the engine 206. The SCR 265 and ASC 267 are further coupled to an SCR doser 263 for dosing an SCR reductant fluid or SCR reagent (e.g., urea-based, diesel exhaust fluid (DEF)), as specifically illustrated in FIG. 2*c*. Upon injection of the SCR reductant fluid or SCR reagent, the $NO_X$ from the exhaust reacts with the reductant fluid over the catalyst in the SCR 265 and ASC 267 to form nitrogen and water. In another embodiment, although a urea-based SCR 265 is shown, other SCRs known in the art may also be used (e.g., hydrocarbon based SCRs, solid SCRs, De-$NO_X$ systems, etc.). In yet another embodiment, the system may be adapted to lower $NO_X$ emissions prior to lowering the particulate matter (PM), hydrocarbons and/or carbon monoxide emissions. In such an arrangement, the SCR system 265/267 is located upstream of the filtration system 255/257.

Figure 2C:
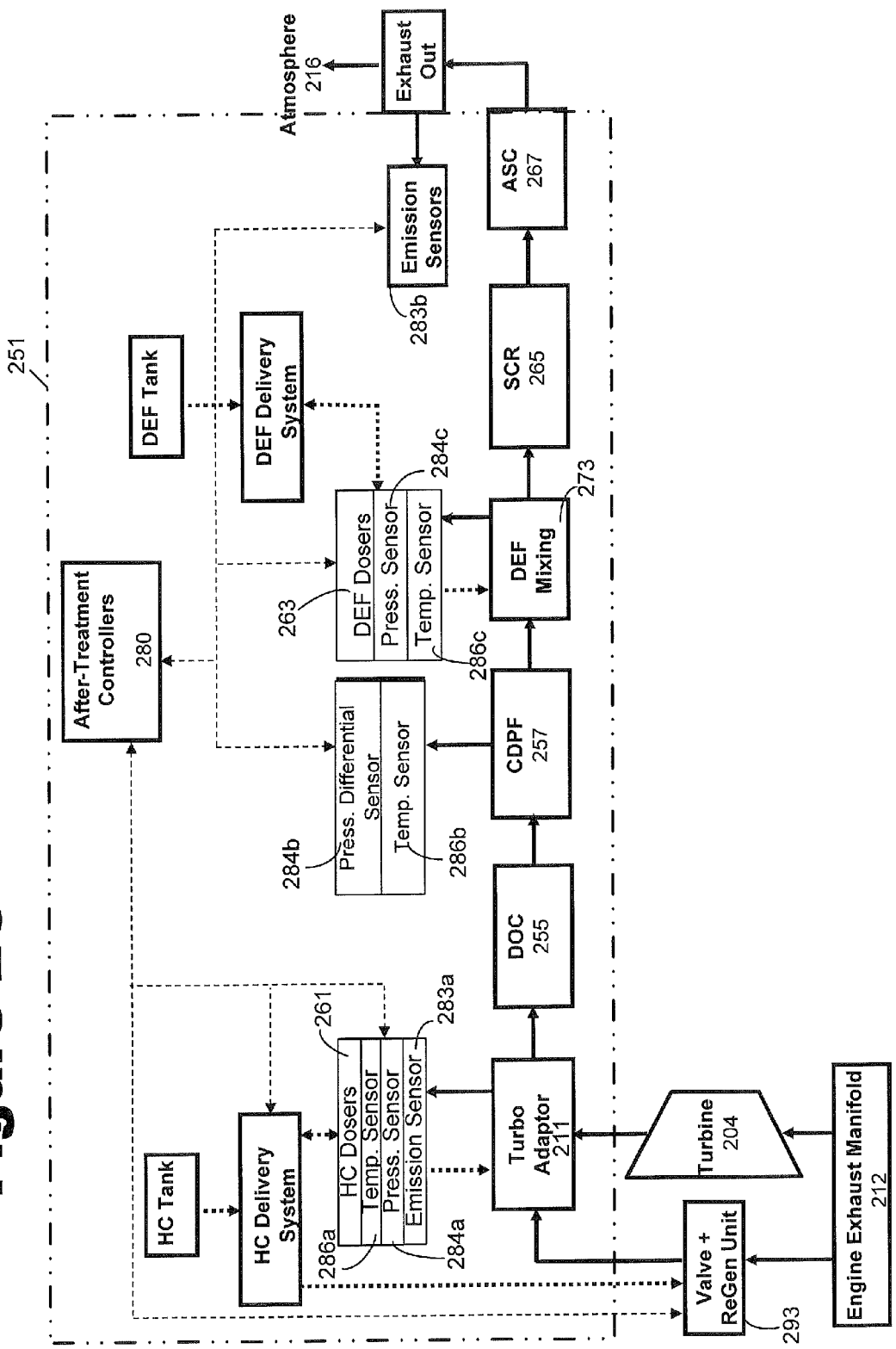
FIG. 2c is a system diagram of a control system for a two-stroke diesel having an exhaust aftertreatment system having a $NO_X$ reduction system and a filtration system.

In one example, shown in FIG. 2c, the present exhaust aftertreatment system 251 may include a control system 280 for controlling the cleanliness of the DPF 257 similar to that shown and described with respect to FIG. 2a. Specifically, the control system 280 may be adapted to control temperature of exhaust gas at the DPF 257 to promote oxidation of the filter. As discussed above, the DOC/DPF arrangement 255/257 may be adapted to passively regenerate and oxidize soot within the DPF 257. However, the DPF 257 will accumulate ash and some soot, which must be removed in order to maintain the DPF efficiency. Accordingly, the control system 280 monitors and determines whether exhaust gas at the DOC/DPF arrangement 255/257 has reached a select temperature, at which oxidation may occur at the DPF 257. Specifically the control system 280 monitors the temperature of exhaust gas at either the DOC 255 inlet or DOC 255 outlet using temperature sensors 286a. It is specifically critical for the exhaust temperature to be above the select threshold at the DPF 257 such that soot therein may be oxidized. Because exhaust temperature may decrease as exhaust flows through the DOC 255, it is preferable that the temperature sensor 286a be situated at the DOC 255 outlet to provide a more accurate indication of the exhaust temperature at the DPF 257.

If cleaning is desired and the exhaust temperature is not within the oxidation temperature range (e.g., between about 240° C. and about 280° C., and preferably about 280° C.), the control system 280 may signal a heating device 293 (e.g., optional burner, or other heating element) to heat a select volume of exhaust entering the exhaust aftertreatment system from the exhaust manifold 212. For example, exhaust burner lines from the engine upstream of the turbocharger (e.g., from the engine exhaust manifold 212) may be in communication with the exhaust aftertreatment system 251, via the turbocharger mixing manifold 211, to direct a select amount of exhaust directly from the engine (e.g., from the engine exhaust manifold 212) to a heating device in the form of a burner or other heating element, and then to the exhaust aftertreatment system 251 via the turbocharger mixing manifold 211. The select amount of exhaust is heated to a select temperature and introduced into the exhaust stream at the turbocharger mixing manifold 211. The select amount of exhaust is preferably introduced upstream of the location of the DOC/DPF doser. The heated exhaust is mixed with the exhaust in the turbocharger mixing manifold 211 to achieve a temperature of between about 240° C. and about 280° C., and preferably about 280° C., at which oxidation of soot on the filter of the DOC/DPF arrangement 255/257 is promoted. The operation of the optional heating device in the form of a burner or other heating element may be controlled by the control system 280. As a result, the control system 280 promotes oxidation of soot on the filter.

Moreover, the control system may be adapted to monitor and control the pressure differential across the DPF 257. In one embodiment, the control system 280 may use a pressure differential sensor 284b at the DPF 257 for monitoring the pressure differential across the DPF 257. Specifically, a pressure sensor is situated before and after the DPF 257 to determine the pressure differential thereof. As ash and soot accumulate, the pressure differential across the DPF 257 increases. When the DPF 257 is functioning properly, the pressure differential is between about 3.5 kPa and about 6.5 kPa. Therefore, high pressure (i.e., above between about 3.5 kPa and about 6.5 kPa) may indicate that soot has accumulated at the DPF 257. As described above, in order to clean the filter, the control system 280 may be adapted to increase temperature of exhaust gas at the DPF 257, and dose accordingly, to promote oxidation of soot on the filter.

In another embodiment, the control system may use a pressure sensor 284a at the inlet to the exhaust aftertreatment system 251 (i.e., turbocharger adapter or mixing manifold 211) to determine backpressure of the exhaust aftertreatment system. High backpressure at the turbocharger mixing manifold 211 is indicative of soot accumulation at the DPF 257. Thus, in response to an indication from the pressure sensor 284a, the control system 280 may be adapted to increase exhaust gas temperature at the DOC/DPF arrangement 255/257, as described above.

The control system 280 may further be adapted to create a predictive model for determining when the filter should be cleaned. Specifically, the control system 280 may use an emissions sensor 283a at the exhaust aftertreatment system inlet to measure particulate matter (PM) and $NO_X$ in the exhaust entering the system over a specific length of time. Based on these measurements, the control system 280 calculates and maps the estimated soot accumulated on the filter. As a result, it is possible to measure the length of time it takes for the filter to become filled with soot, and therefore to predict when the filter will need cleaning. Thus, the control system 280 may be adapted to include open loop control to determine the operable lifespan of the filter.

Moreover, the control system 280 may be adapted to monitor PM levels of exhaust in order to determine the health of the DPF 257. Specifically, the control system 280 may use an emissions sensor 283b at the exhaust outlet to measure PM levels in the exhaust. As described above, the DOC 255 uses an oxidation process to reduce the particulate matter (PM), hydrocarbons and/or carbon monoxide emissions in the exhaust gases, while DPF 257 filters PM and/or soot from the exhaust gases. When PM levels are above a select threshold (e.g., EPA Tier IV emissions standards referred to above), it is indicative that the DPF 257 is not functioning properly. Therefore, in this embodiment, if the emissions sensor 283b indicates PM levels are higher than the select threshold, the control system 280 may signal that the DPF 257 needs to be removed and replaced.

Additionally, the control system may be coupled to a DOC/DPF doser 261 (e.g., a hydrocarbon injector), which adds fuel onto the catalyst for the DOC/DPF arrangement 255/257 for active regeneration of the filter, as described above. In order for dosing to be effective, exhaust temperature at the DOC/DPF arrangement 255/257 must be within or above the operational temperature range (e.g., between about 240° C. and 280° C., and preferably about 280° C.). Therefore, the control system 280 may be adapted to control dosing such that the injector does not dose unless the exhaust gas temperature is within or above the oxidation range.

Moreover, the control system is adapted to monitor and control exhaust temperature at the DOC/DPF arrangement 255/257. Specifically, the control system 280 uses a temperature sensor 286b at the DOC 255, and preferably at the DOC 255 outlet, to measure temperature of exhaust. If the exhaust temperature at the DOC/DPF arrangement 255/257 is below 280° C., the control system 280, the control system 280 may be adapted to increase exhaust temperature, as described above. However, dosing may cause the exhaust temperature at the DOC/DPF arrangement 255/257 to increase beyond permissible operational ranges. Specifically, if the exhaust gas temperature at the DOC/DPF arrangement 255/257 is higher than between about 550° C. and about 650° C., and preferably about 650° C., the DPF 257 unit may crack and/or the lifespan of the filter may be otherwise reduced. Therefore, the control system 280 may be adapted to control dosing such that the temperature at the DOC/DPF arrangement 255/257 is maintained preferably above about 280° C. and below about 650° C. for effective oxidation of soot on the filter.

Additionally, the control system 280 of FIG. 2c may be further adapted to monitor the SCR 265 and ASC 267 arrangement, and to control $NO_X$ reduction by administering the SCR reductant fluid or SCR reagent injection based on the monitored values. Specifically, the control system may use an emissions sensor at the exhaust outlet to measure $NO_X$ levels in the exhaust. If the sensor indicates $NO_X$ levels are higher than a select threshold (e.g., EPA Tier IV emissions standards referred to above), the control system 280 may be adapted to signal to the SCR doser to increase injection of SCR reductant fluid or SCR reagent. In contrast, the control system 280 may be adapted to signal to the SCR doser to decrease injection of SCR reductant fluid or SCR reagent when $NO_X$ levels are less than a select threshold.

Moreover, the control system may further be adapted to detect overdosing of SCR reductant fluid or SCR reagent injection by using the emissions sensor at the exhaust outlet to measure $NO_X$ levels in the exhaust. Overdosing of SCR reductant fluid or SCR reagent injection generally results in increased $NO_X$ emissions. If the sensor indicates that $NO_X$ levels are higher than a select threshold, the control system 280 may be adapted to signal the SCR doser to reduce SCR reductant fluid and/or SCR reagent injection.

The control system 280 may further be adapted to control injection of SCR reductant fluid or SCR reagent based on temperature. For example, the SCR 265 and ASC 267 may have select temperature operability ranges (e.g., between about 200° C. and about 400° C., and preferably above about 230° C. and below about 400° C.), wherein the SCR 265 and ASC 267 may only reduce $NO_X$ at certain temperatures. In the embodiment illustrated in FIG. 2c, the control system 280 uses a temperature sensor 286c at the $NO_X$ reduction system 265/267, and specifically at the dosing mixing area 273, to determine whether the exhaust gas temperature is between a select temperature range (e.g., between about 230° C. and about 400° C.). In this arrangement, the control system 280 may be adapted to signal the injector 263 to only operate when the exhaust temperature is within this select temperature range.

Moreover, the control system 280 may be adapted to monitor pressure at the $NO_X$ reduction system 265/267. Specifically, the exhaust aftertreatment system 251 may include a pressure sensor 284c situated at the $NO_X$ reduction system 265/267, which is diagnostic. Specifically, if pressure is high at the $NO_X$ reduction system 265/267 it is generally indicative of a problem with mixing at the mixing area 273. Therefore, in response to an indication from the sensor that pressure at the $NO_X$ reduction system is high, the control system 280 may signal that the mixing area requires maintenance.

Additionally, the present disclosure is directed to a method for reducing emissions in exhaust expelled the engine of a locomotive having an exhaust aftertreatment system (e.g., as shown in the embodiments of FIGS. 2a-2c and their relevant disclosures). Specifically, the exhaust aftertreatment system may include a turbocharger mixing manifold adapted to receive exhaust from the engine and a filtration system coupled thereto. The filtration system generally includes a catalyst and a filter adapted to filter particulate matter from the exhaust. The aftertreatment system further includes a heating device coupled to the engine for heating at least a portion of the exhaust entering the turbocharger mixing manifold, wherein the turbocharger mixing manifold is sized and shaped to promote mixing of the exhaust from the locomotive engine and the portion of heated exhaust from the heating device. The manifold generally delivers this mixture of engine exhaust and heated exhaust to the filtration system. The present method includes the steps of: (1) providing exhaust from the locomotive engine to the turbocharger mixing manifold; (2) measuring exhaust temperature at the filtration system; (3) adaptively delivering a select volume of exhaust from the locomotive engine to the heating device; (4) adaptively heating the select volume of exhaust delivered to the heating device to a select temperature in response to exhaust temperature values measured for adaptive temperature regulation thereof; (5) delivering the select volume of heated exhaust to the manifold; (6) mixing the exhaust from the locomotive engine and the portion of heated exhaust within in the manifold; and (7) delivering the mixed exhaust to the filtration system, wherein regulation of exhaust temperature at the filtration system promotes oxidation of the filter, such that health of the filter is maintained and emissions are reduced. Additionally, the present method may further include the step of adding fuel to the mixture of exhaust from the locomotive engine and the portion of heated exhaust, wherein the fuel and exhaust mixture reacts with oxygen in the presence of the catalyst to promote oxidation of soot on the filter.

As illustrated in FIGS. 3-9, an EGR system may be used to reduce exhaust emissions. These EGR systems may be used in conjunction with the exhaust aftertreatment systems of FIGS. 2a and 2b to further reduce exhaust emissions. Such emissions systems for a diesel locomotive engine which include both an EGR system and an exhaust aftertreatment system are described in detail with respect to FIGS. 10-11.

Figure 3:
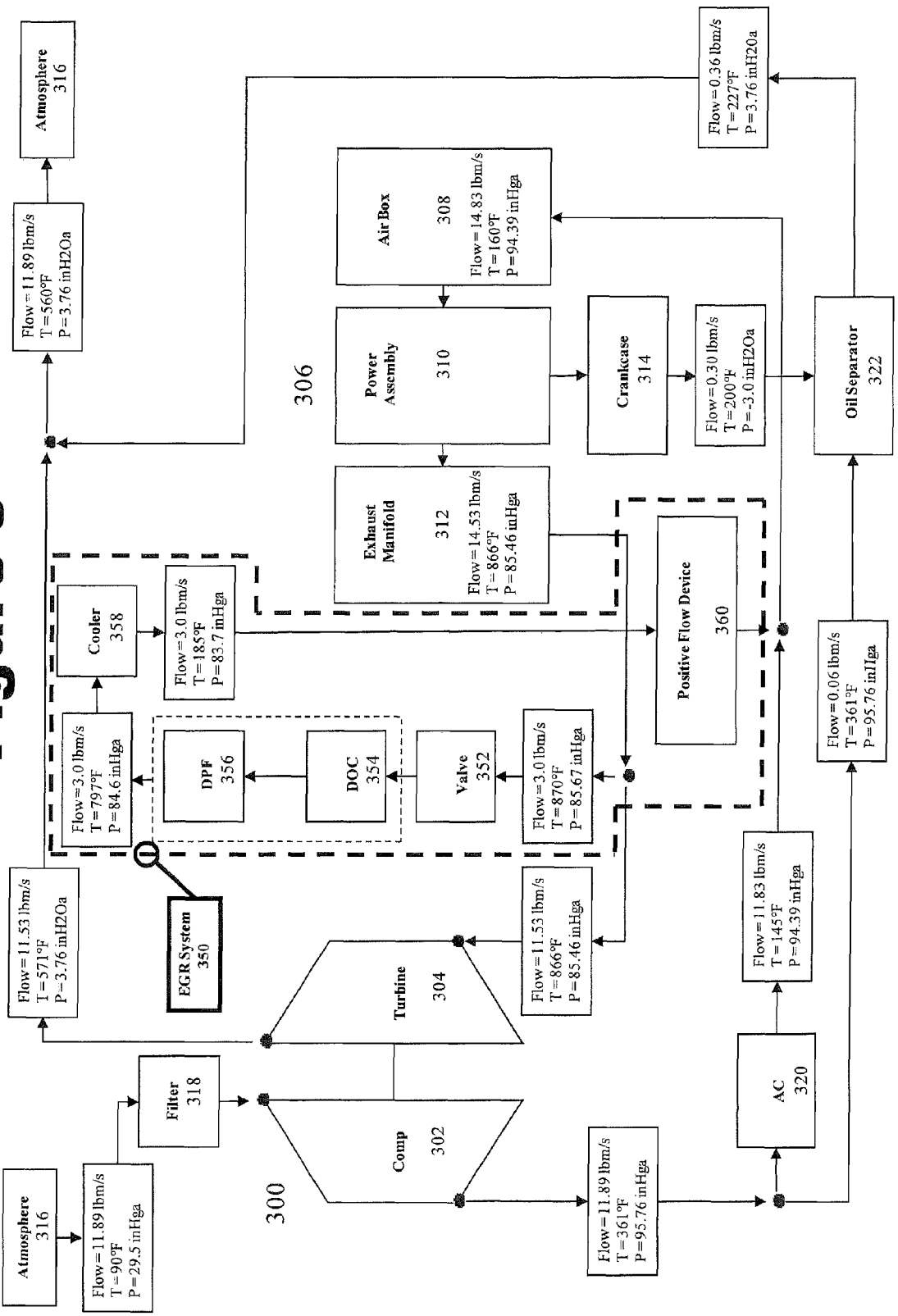
FIG. 3 is a system diagram of the two-stroke diesel engine system having an EGR system in accordance with an embodiment of the present disclosure.

As shown in FIG. 3, an EGR system 350 is illustrated which recirculates exhaust gases from the exhaust manifold 312 of the engine 306, mixes the exhaust gases with the cooled charge air of the aftercooler 320, and delivers such to the airbox 308. In this EGR system 350, only a select percentage of the exhaust gases is recirculated and mixed with the intake charge air in order to selectively reduce pollutant emissions (including $NO_X$) while achieving desired fuel efficiency. The percentage of exhaust gases to be recirculated is also dependent on the amount of exhaust gas flow needed for powering the compressor 302 of the turbocharger 300. It is desired that enough exhaust gas powers the turbine 304 of the turbocharger 300 such that an optimal amount of fresh air is transferred to the engine 306 for combustion purposes. For locomotive diesel engine applications, it is desired that less than about 35% of the total gas (including compressed fresh air from the turbocharger and recirculated exhaust gas) delivered to the airbox 308 be recirculated. This arrangement provides for pollutant emissions (including $NO_X$) to be reduced, while achieving desired fuel efficiency.

A flow regulating device may be provided for regulating the amount of exhaust gases to be recirculated. In one embodiment, the flow regulating device is a valve 352 as illustrated in FIG. 3. Alternatively, the flow regulating device may be a positive flow device 360, wherein there is no valve (not shown) or the valve 352 may function as an on/off valve as will be discussed in greater detail below.

The select percentage of exhaust gases to be recirculated may be optionally filtered. Filtration is used to reduce the particulates that will be introduced into engine 306 during recirculation. The introduction of particulates into the engine 306 causes accelerated wear especially in uniflow two-stroke diesel engine applications. If the exhaust gases are not filtered and recirculated into the engine, the unfiltered particulates from the combustion cycle would accelerate wear of the piston rings and cylinder liner. For example, uniflow two-stroke diesel engines are especially sensitive to cylinder liner wall scuffing as hard particulates are dragged along by the piston rings the cylinder liner walls after passing through the intake ports. Oxidation and filtration may also be used to prevent fouling and wear of other EGR system components (e.g., cooler 358 and positive flow device 360) or engine system components. In FIG. 3, a diesel oxidation catalyst (DOC) 354 and a diesel particulate filter (DPF) 356 are provided for filtration purposes. The DOC 354 uses an oxidation process to reduce the particulate matter (PM), hydrocarbons and/or carbon monoxide emissions in the exhaust gases. The DPF 356 includes a filter to reduce PM and/or soot from the exhaust gases. The DOC/DPF arrangement 354/356 may be adapted to passively regenerate and oxidize soot. Although a DOC 354 and DPF 356 are shown, other comparable filters may be used.

The filtered air is optionally cooled using cooler 358. The cooler 358 serves to decrease the recirculated exhaust gas temperature, thereby providing a denser intake charge to the engine. The decrease in recirculated exhaust gas intake temperature reduces $NO_X$ emissions and improves fuel economy. It is preferable to have cooled exhaust gas as compared to hotter exhaust gas at this point in the EGR system due to ease of deliverability and compatibility with downstream EGR system and engine components.

The cooled exhaust gas flows to a positive flow device 360 which provides for the necessary pressure increase to overcome the pressure loss within the EGR system 350 itself and overcome the adverse pressure gradient between the exhaust manifold 312 and the introduction location of the recirculated exhaust gas. Specifically, the positive flow device 360 increases the static pressure of the recirculated exhaust gas sufficient to introduce the exhaust gas upstream of the power assembly. Alternatively, the positive flow device 360 decreases the static pressure upstream of the power assembly at the introduction location sufficient to force a positive static pressure gradient between the exhaust manifold 312 and the introduction location upstream of the power assembly 310. The positive flow device 360 may be in the form of a roots blower, a venturi, centrifugal compressor, propeller, turbocharger, pump or the like. The positive flow device 360 may be internally sealed such that oil does not contaminate the exhaust gas to be recirculated.

As shown in FIG. 3, there is a positive pressure gradient between the airbox 308 (e.g., about 94.39 inHga) to the exhaust manifold 312 (e.g., about 85.46 inHga) necessary to attain the necessary levels of cylinder scavenging and mixing. In order to recirculate exhaust gas, the recirculated exhaust gas pressure is increased to at least match the aftercooler discharge pressure as well as overcome additional pressure drops through the EGR system 350. Accordingly, the exhaust gas is compressed by the positive flow device 360 and mixed with fresh air from the aftercooler 320 in order to reduce $NO_X$ emissions while achieving desired fuel economy. It is preferable that the introduction of the exhaust gas is performed in a manner which promotes mixing of recirculated exhaust gas and fresh air.

As an alternative to the valve 352 regulating the amount of exhaust gas to be recirculated as discussed above, a positive flow device 360 may instead be used to regulate the amount of exhaust gas to be recirculated. For example, the positive flow device 360 may be adapted to control the recirculation flow rate of exhaust gas air from the engine 306, through the EGR system 350, and back into the engine 306. In another example, the valve 352 may function as an on/off type valve, wherein the positive flow device 360 regulates the recirculation flow rate by adapting the circulation speed of the device. In this arrangement, by varying the speed of the positive flow device 360, a varying amount of exhaust gas may be recirculated. In yet another example, the positive flow device 360 is a positive displacement pump (e.g., a roots blower) which regulates the recirculation flow rate by adjusting its speed.

A new turbocharger 300 is provided having a higher pressure ratio than that of the prior art uniflow two-stroke diesel engine turbochargers. The new turbocharger provides for a higher compressed charge of fresh air, which is mixed with the recirculated exhaust gas from the positive flow device 360. The high pressure mixture of fresh air and exhaust gas delivered to the engine 306 provides the desired trapped mass of oxygen necessary for combustion given the low oxygen concentration of the trapped mixture of fresh air and cooled exhaust gas.

Figure 4:
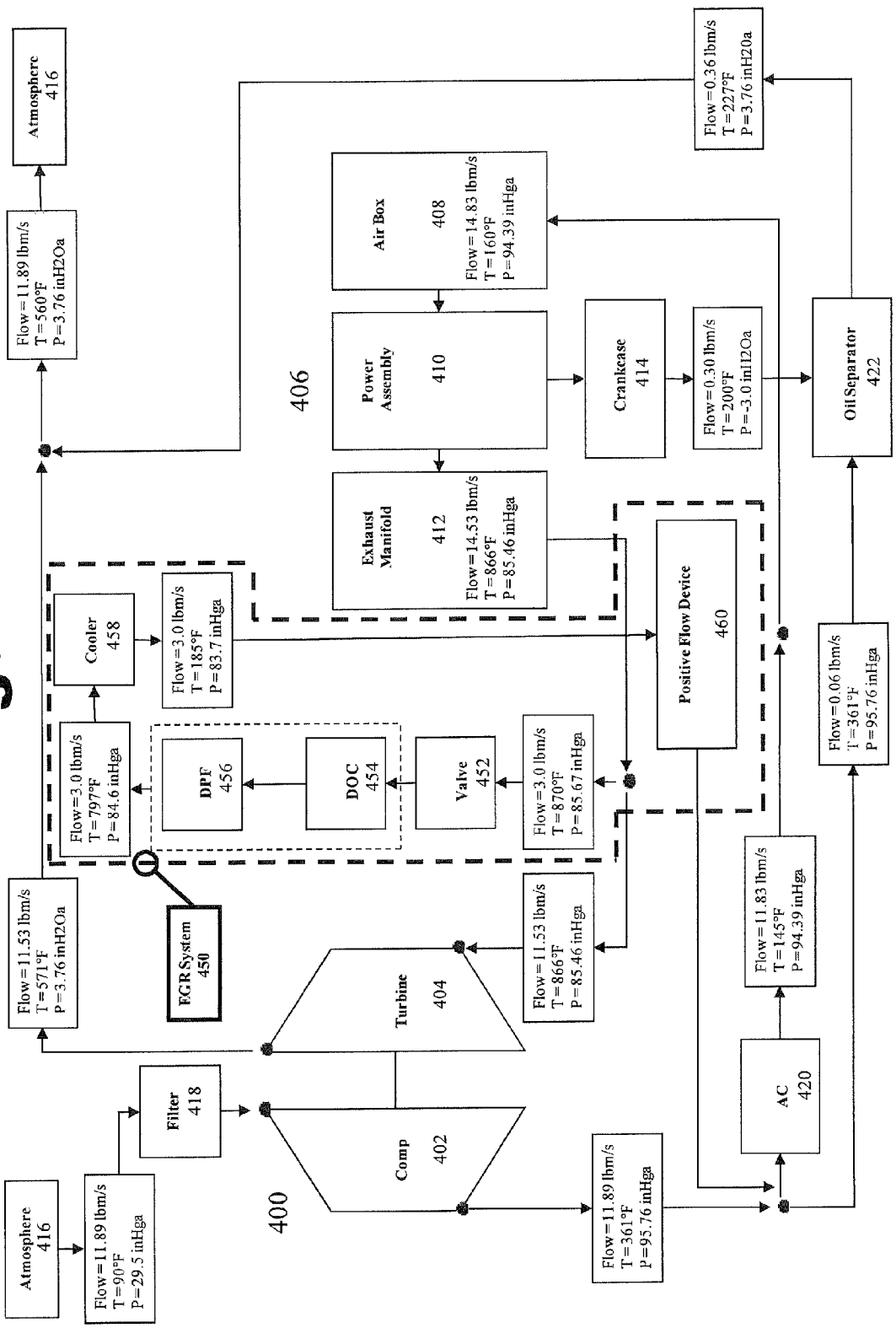
FIG. 4 is a system diagram of the two-stroke diesel engine system having an EGR system in accordance with another embodiment of the present disclosure.

As shown in an EGR system 450 embodiment of FIG. 4, recirculated exhaust gas may be alternatively introduced upstream of the aftercooler 420 and cooled thereby before being directed to the airbox 408 of the engine 406. In this embodiment, the aftercooler 420 (in addition to the cooler 458) cools the fresh charge air from the turbocharger 400 and the recirculated exhaust gas to decrease the overall charge air intake temperature of the engine 406, thereby providing a denser intake charge air to the engine 406. In another embodiment (not shown), an optional oil filter may be situated downstream of the positive flow device 460 to filter any residual oil therefrom. This arrangement prevents oil contamination in the aftercooler 420 and in the recirculated exhaust gas.

Figure 5:
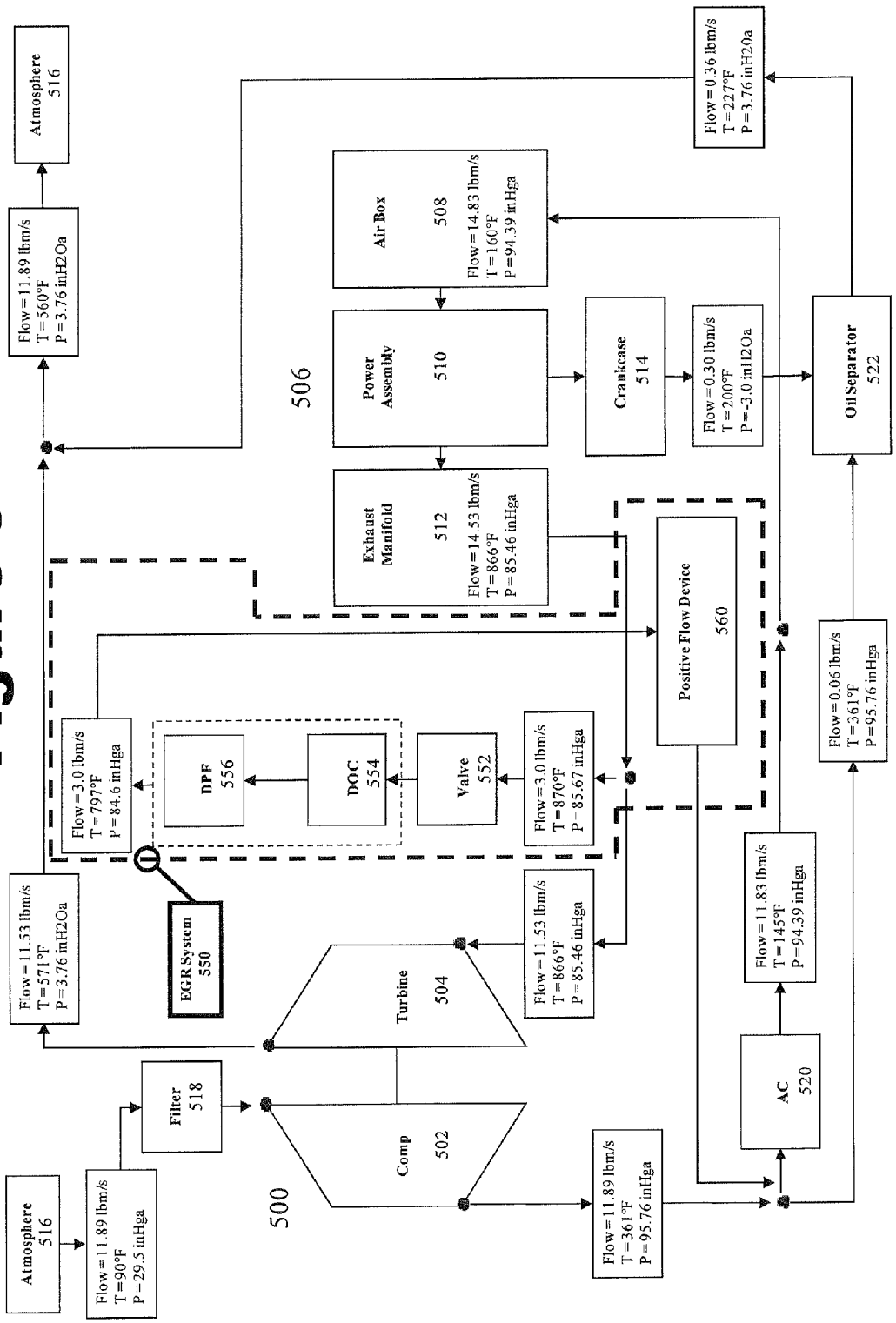
FIG. 5 is a system diagram of the two-stroke diesel engine system having an EGR system in accordance with another embodiment of the present disclosure.

As shown in an EGR system 550 embodiment of FIG. 5, the filtered air may optionally be directed to the aftercooler 520 for the same purposes without the addition of the cooler 358, 458 in FIGS. 3 and 4. In this arrangement, the cooling of the exhaust gas to be recirculated is performed solely by the aftercooler 520. The aftercooler 520 would serve to cool the fresh charge air from the turbocharger and the recirculated exhaust gas, thereby providing a denser overall intake charge air to the engine.

Figure 6:
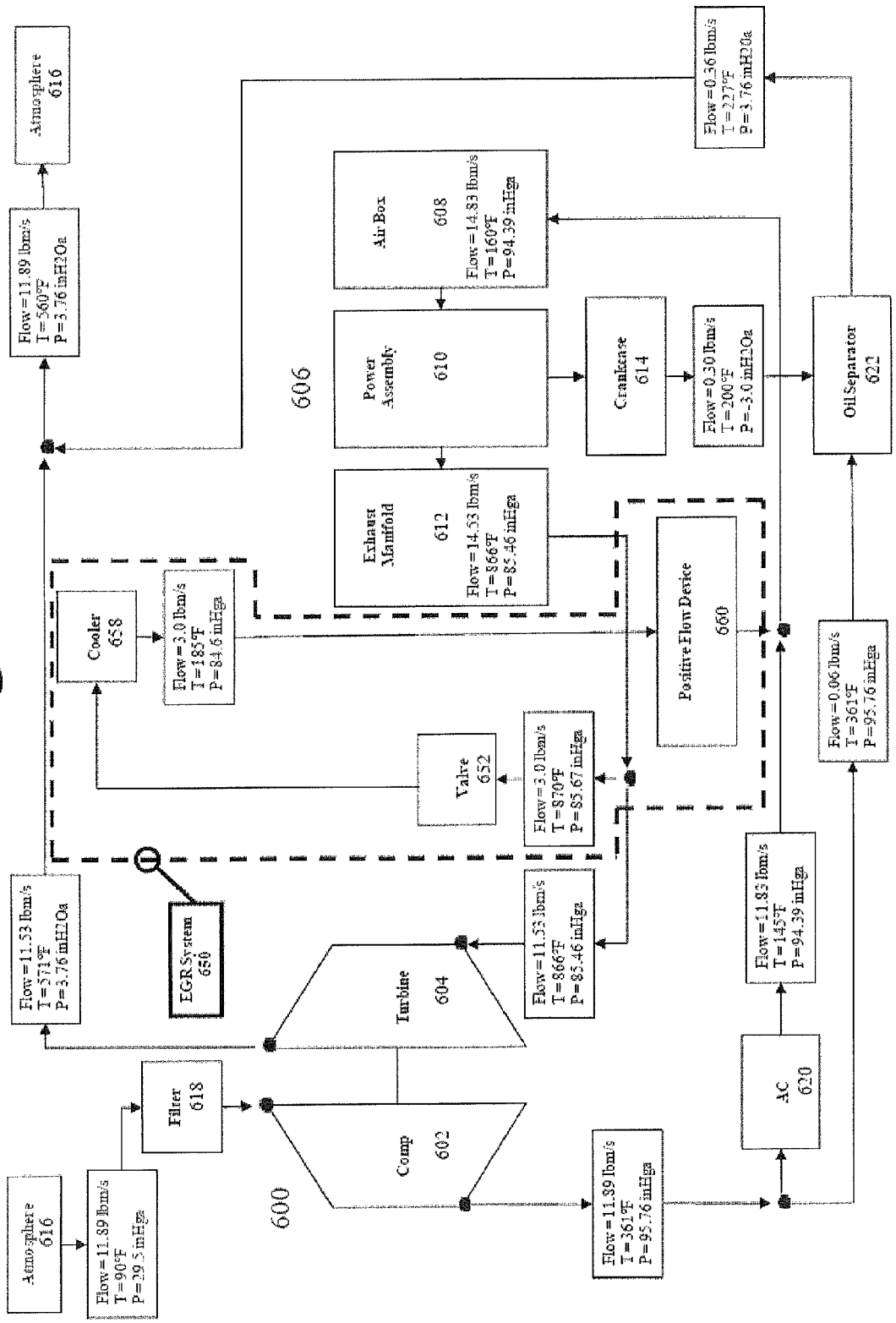
FIG. 6 is a system diagram of the two-stroke diesel engine system having an EGR system in accordance with another embodiment of the present disclosure.

As shown in FIG. 6, an EGR system 650 is illustrated which does not include the DOC/DPF filtration system of the previous embodiments.

Figure 7:
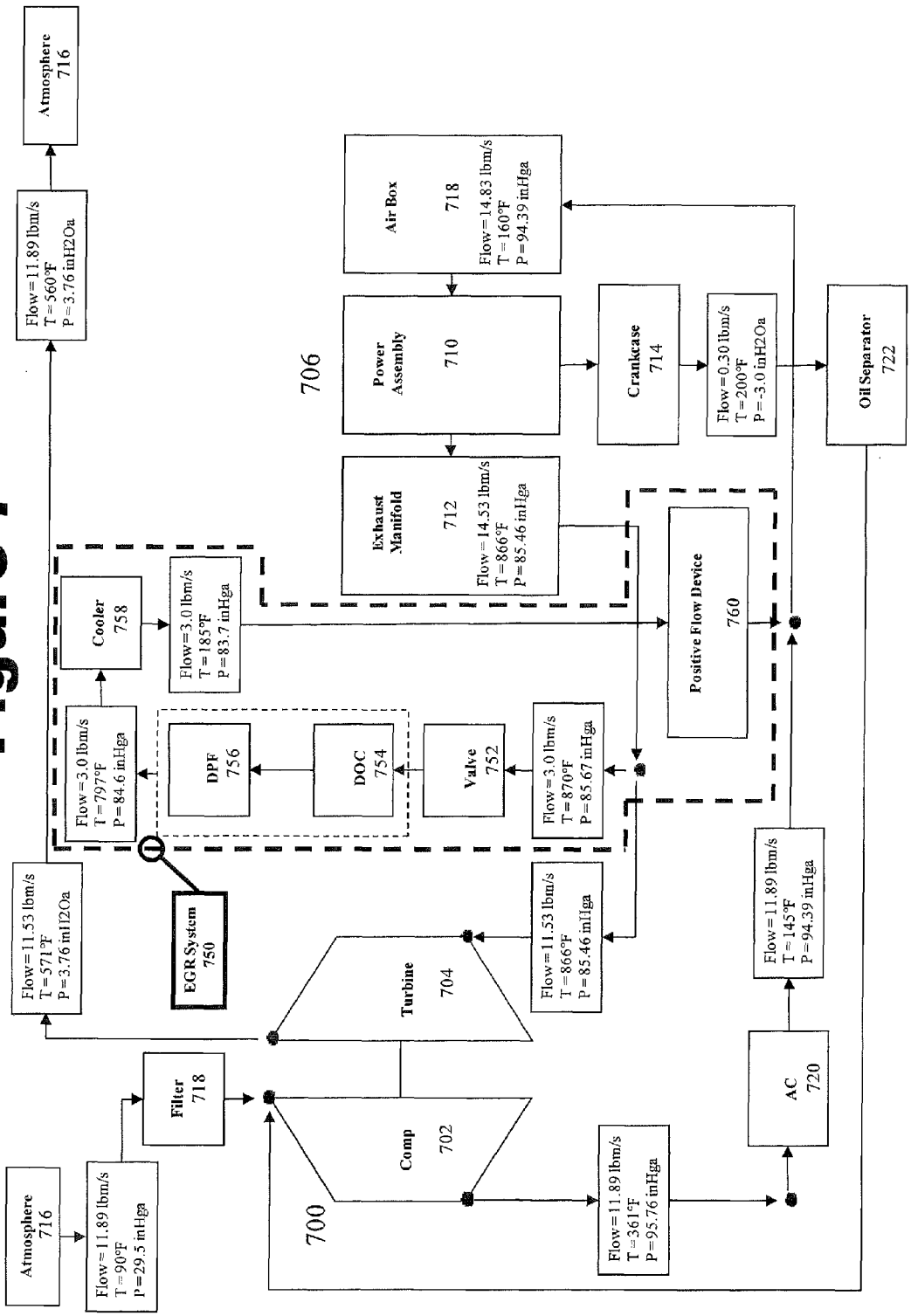
FIG. 7 is a system diagram of the two-stroke diesel engine system having an EGR system in accordance with another embodiment of the present disclosure.

As shown in FIG. 7, an EGR system 750 is illustrated, which is implemented in an engine 706 having a positive or negative crankcase ventilation, whereby the oil separator outlet is directed to the low pressure region upstream of the compressor inlet. Accordingly, the compressed air from the turbocharger 700 is not directed to an oil separator as shown in the previous embodiments.

A control system may further be provided which monitors and controls select components of any of the EGR systems of the previous embodiments, or other similar EGR systems. Specifically, the control system may be adapted to control select components of an EGR system to adaptively regulate exhaust gas recirculation based on various operating conditions of the locomotive. The control system may be in the form of a locomotive control computer, another onboard control computer or other similar control device. Various embodiments of control systems are illustrated in FIG. 8.

Figure 8:
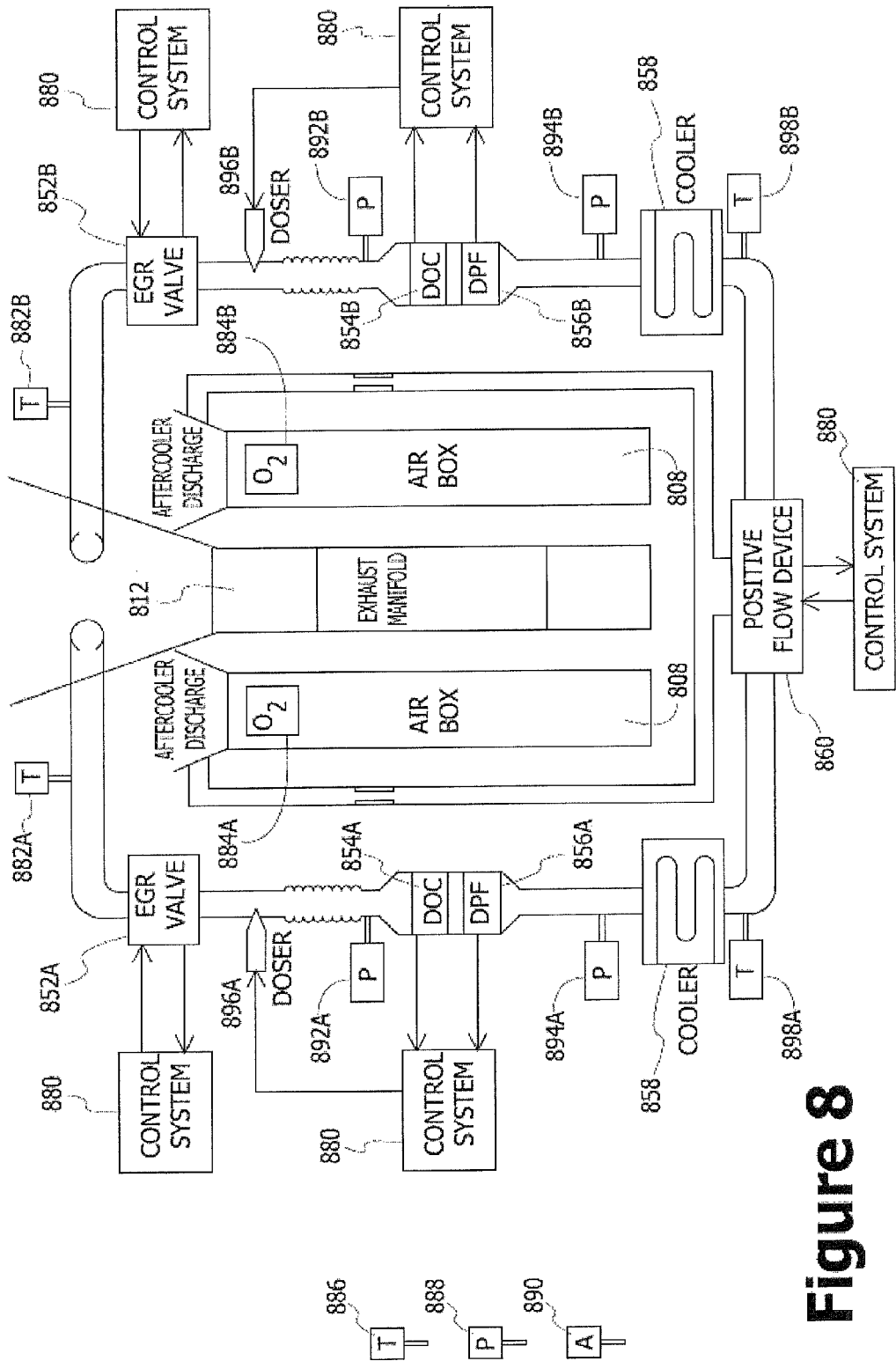
FIG. 8 is a system diagram of a control system for an EGR system for a two-stroke diesel engine in accordance with an embodiment of the present disclosure.
Figure 9B:
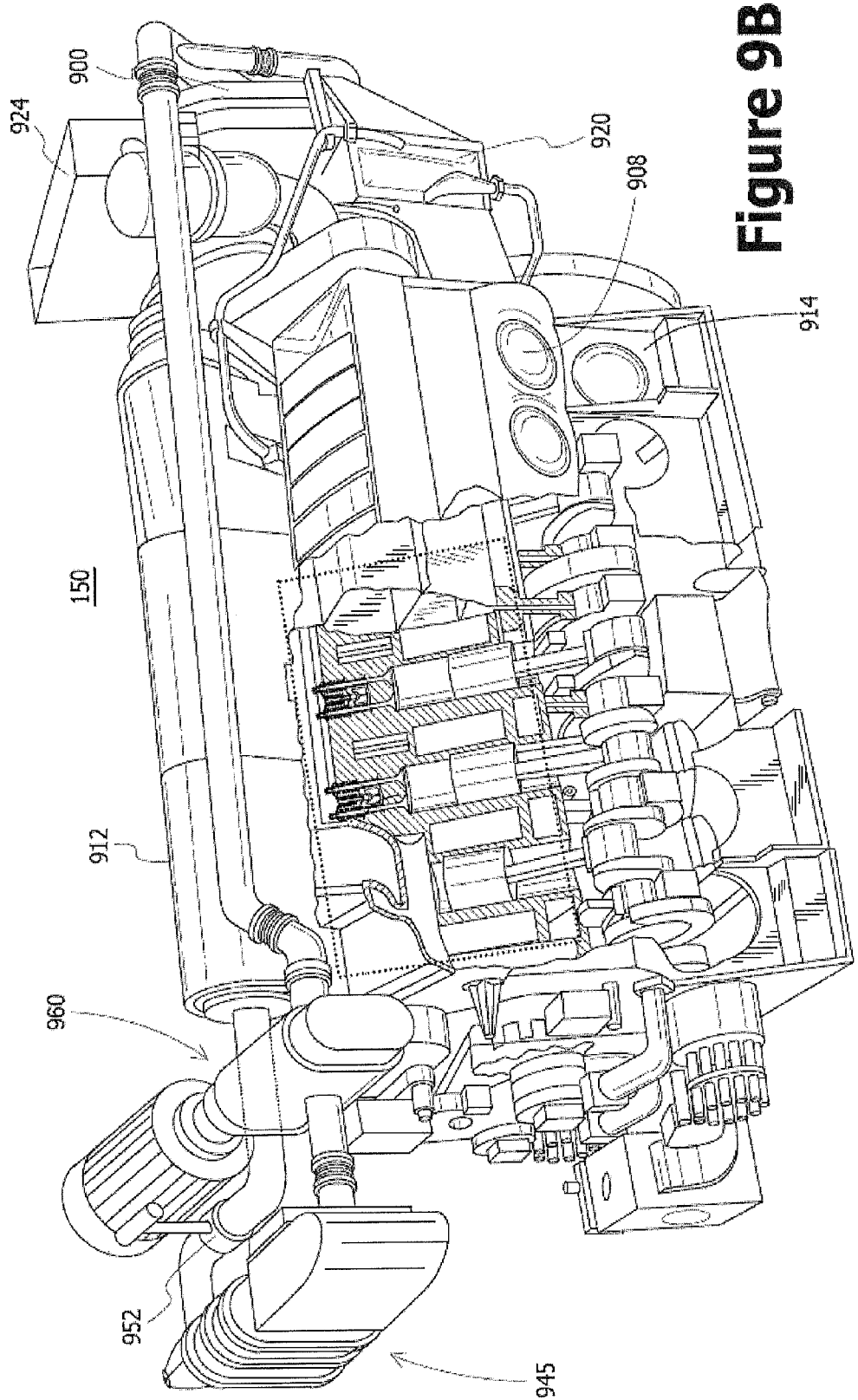
Figure 9C:
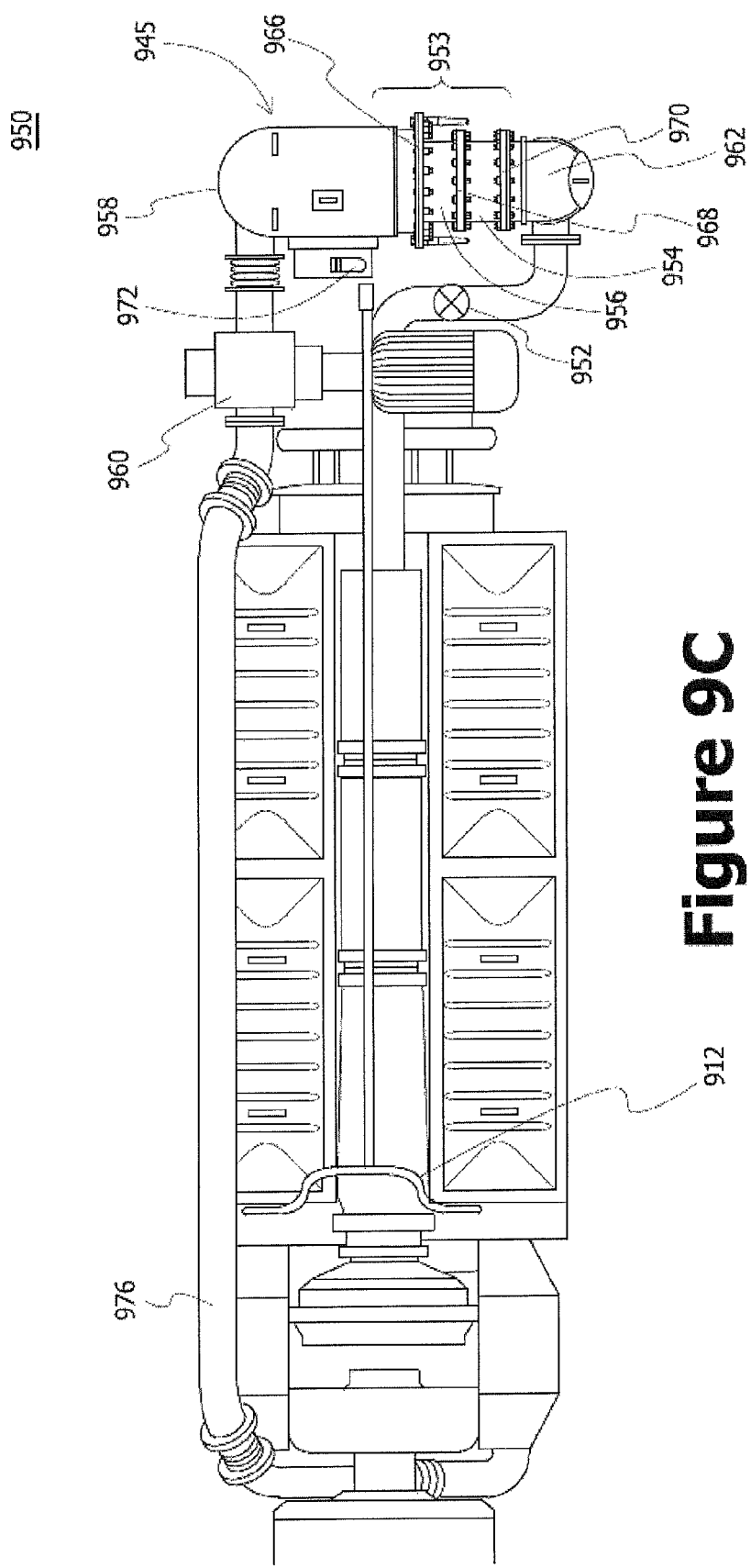
Figure 9D:
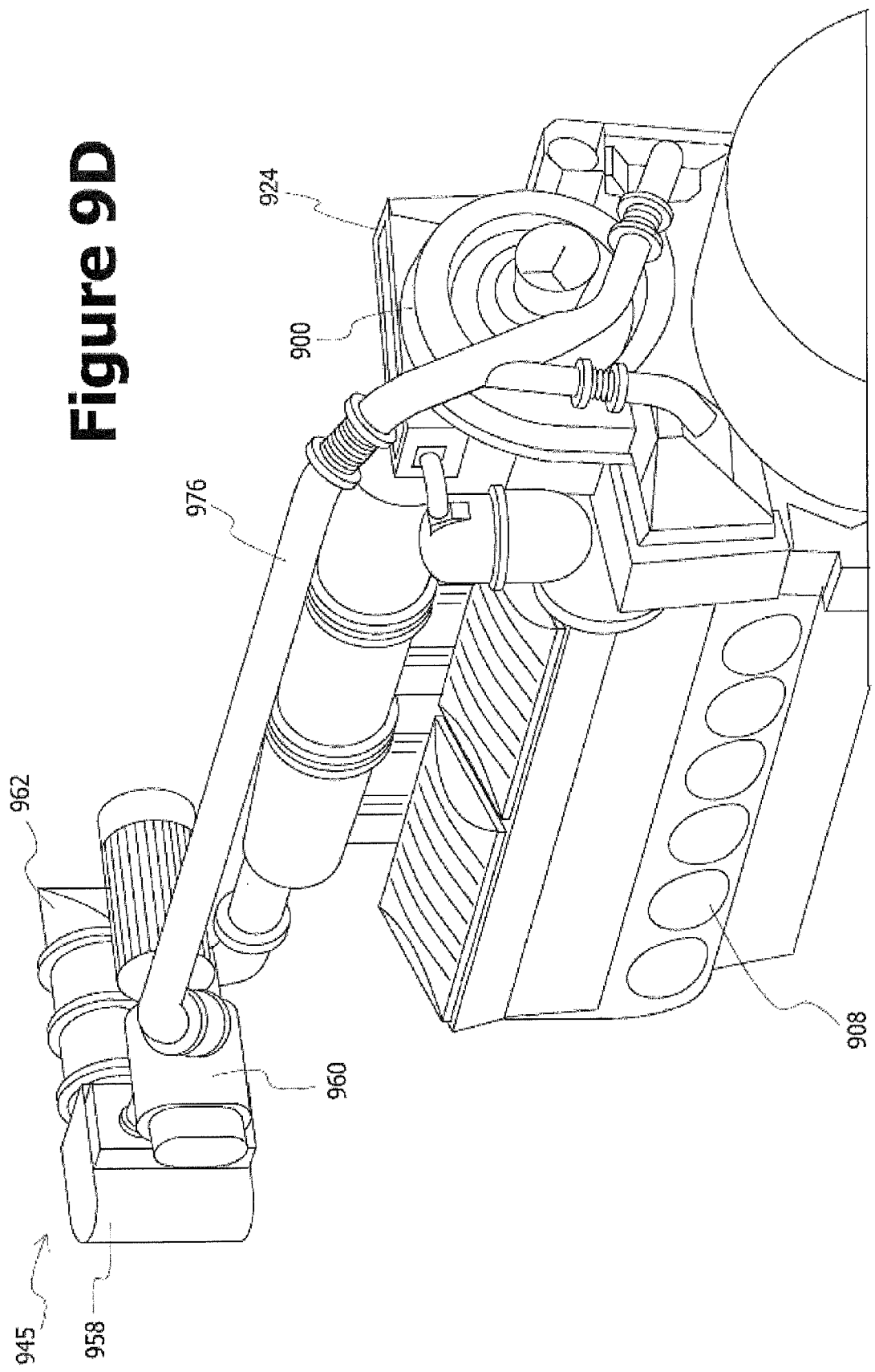
FIG. 9d is a side view of the two-stroke diesel engine system with an EGR system of FIG. 9a, showing ducts for introducing the recirculated exhaust gas into the engine.
Figure 9E:
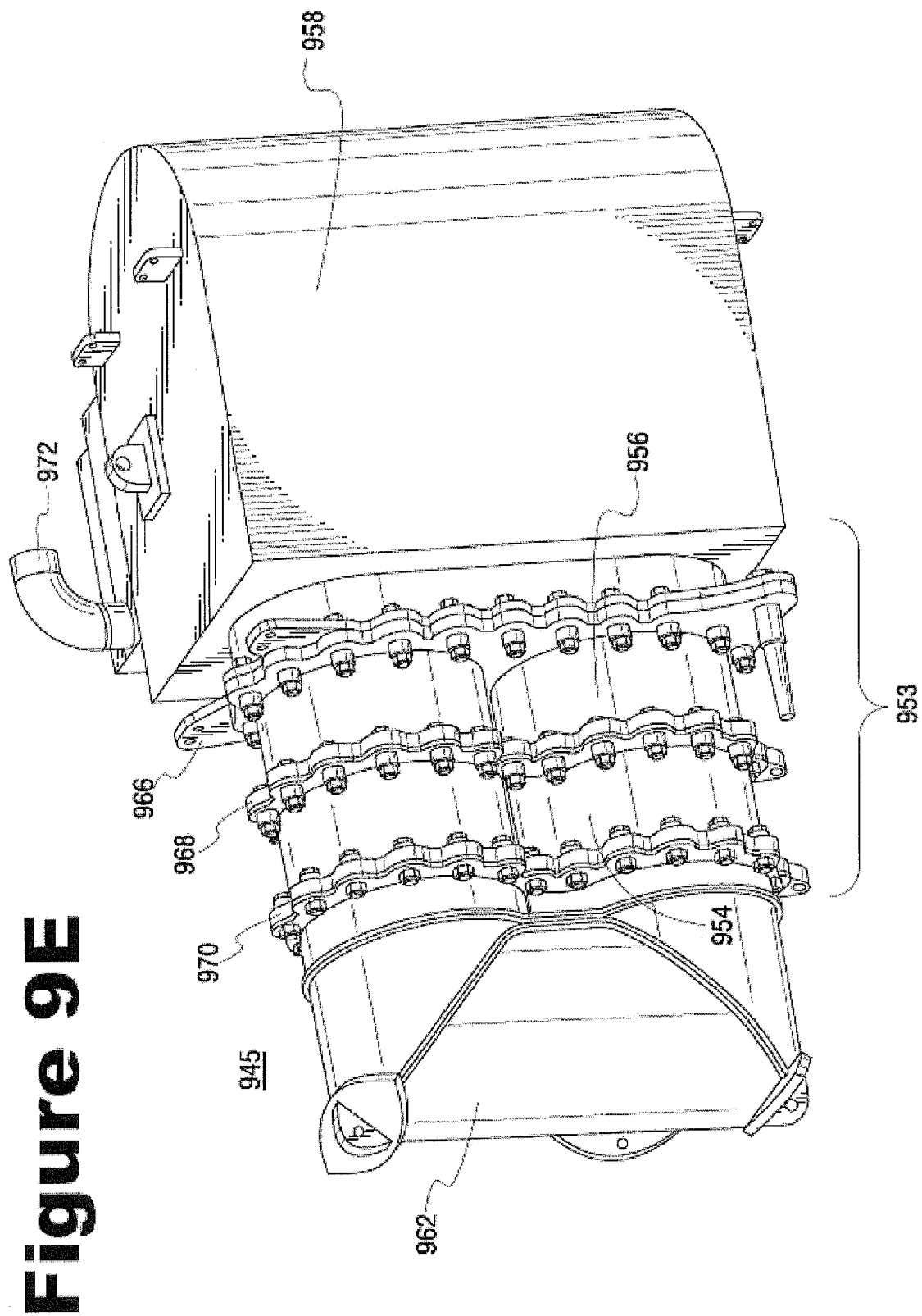
Figure 9F:
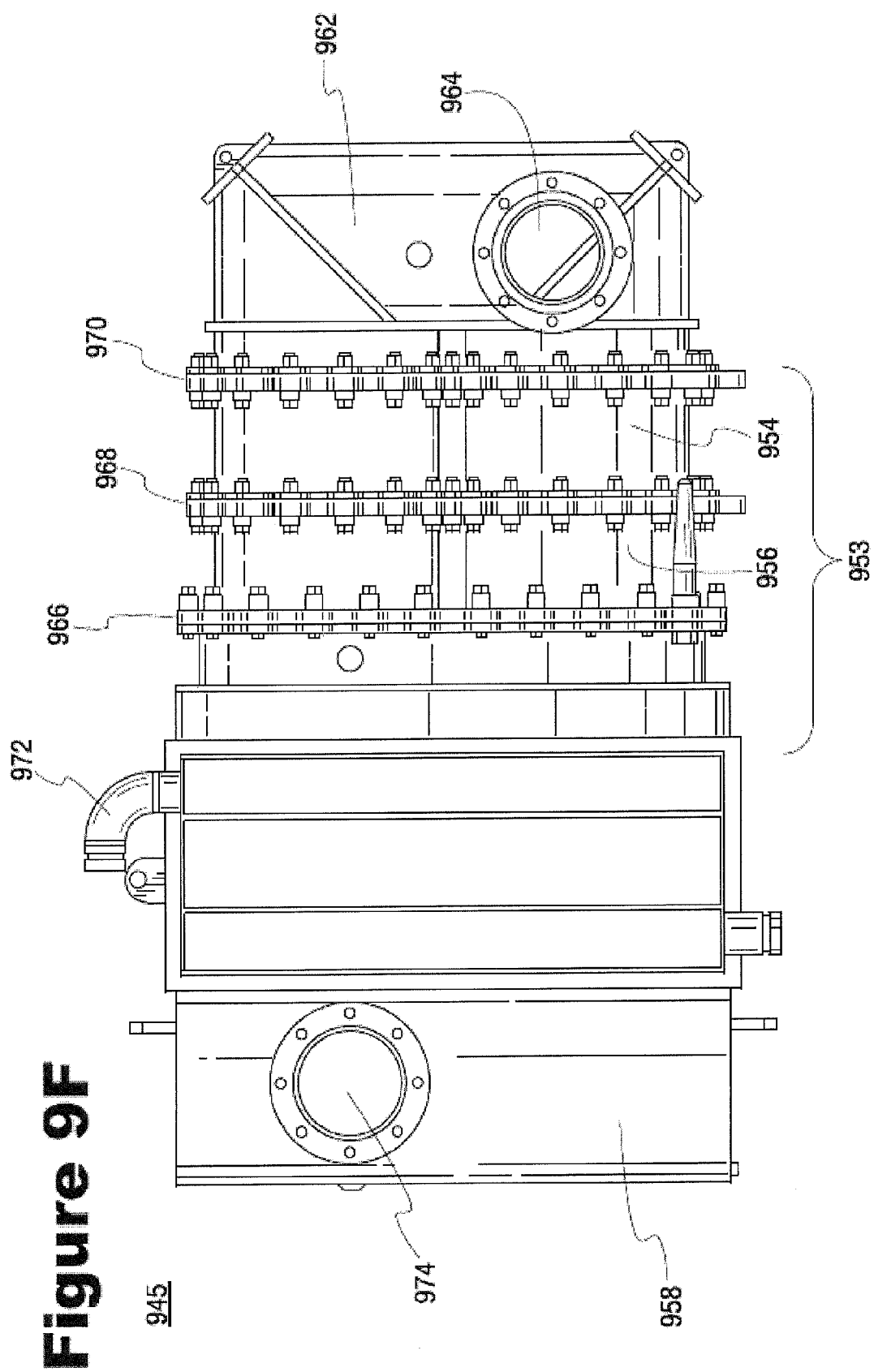
FIG. 9f is a side view of the EGR module of FIG. 9e.
Figure 9G:
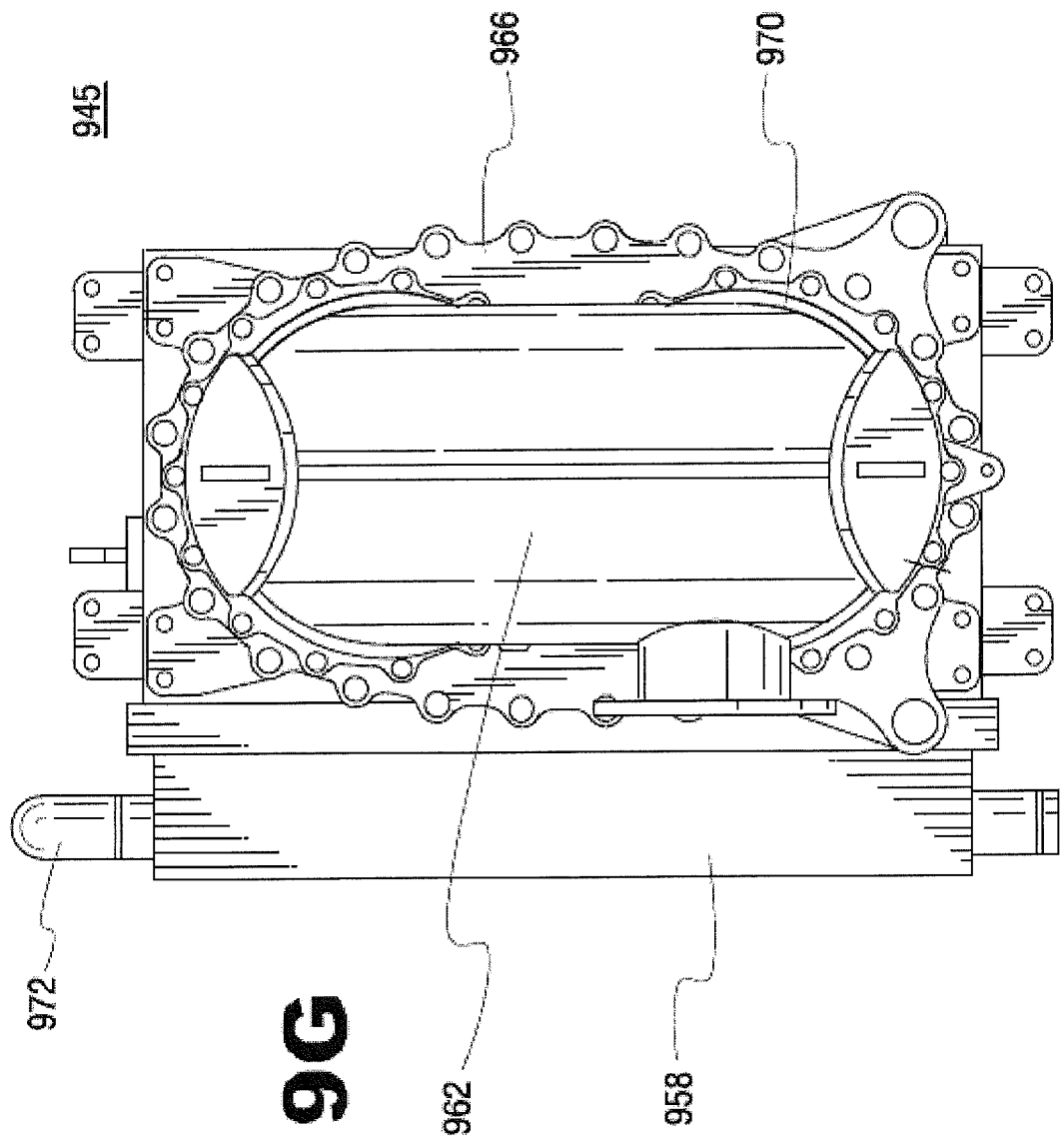
FIG. 9g is a front side view of the EGR module of FIG. 9e.
Figure 9H:
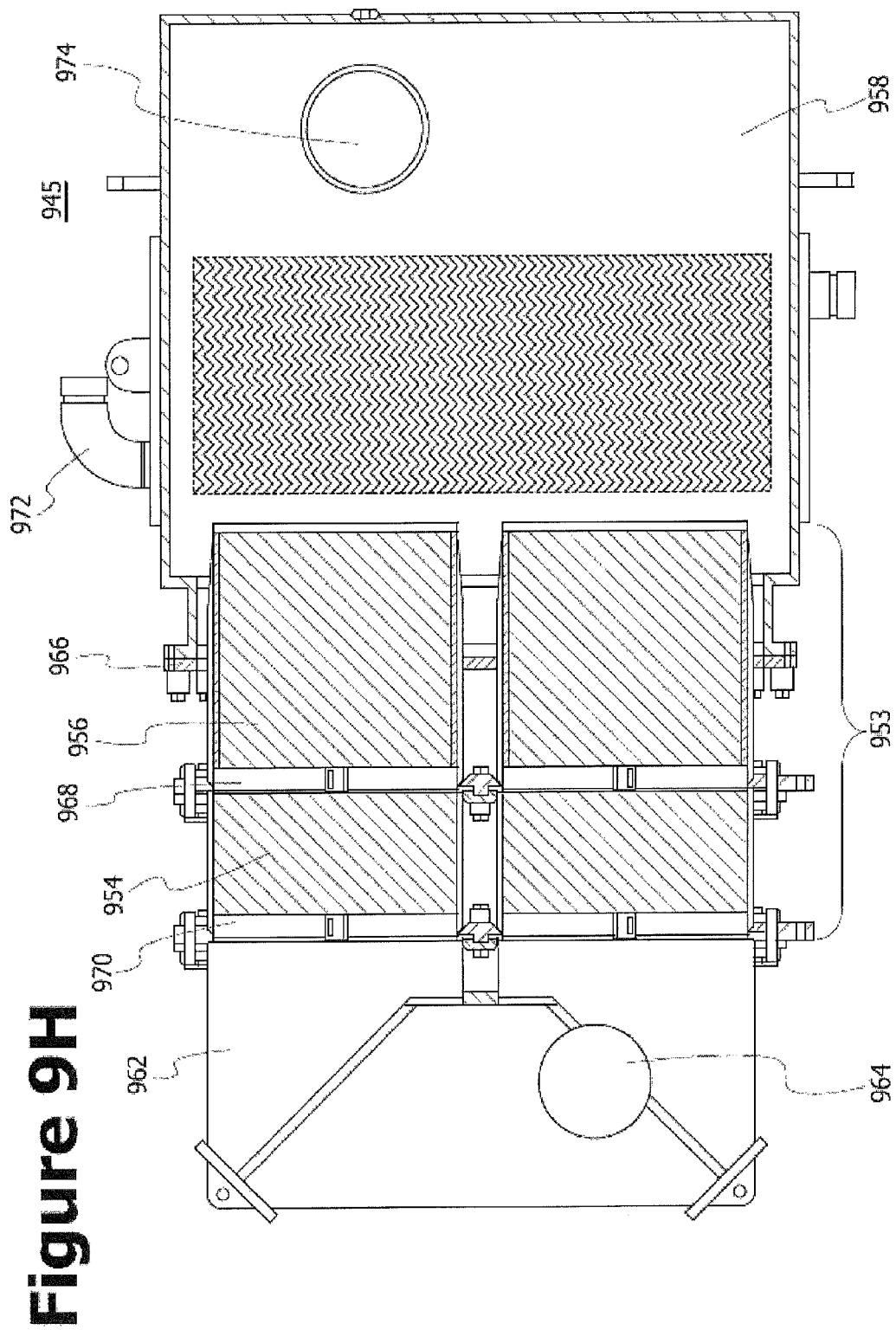
FIG. 9h is a cross sectional view of the EGR module of FIG. 9e.

In one embodiment of FIG. 8, a control system 880 monitors the temperature of the exhaust gas at the exhaust manifold using exhaust manifold temperature sensors 882a, 882b. If the exhaust gas temperature at the exhaust manifold 812 is within the normal operational temperature range of the EGR system, the control system signals the flow regulating device (e.g., valve 852a and 852b and/or positive flow device 860) to recirculate a select amount of exhaust gas through the engine. If the exhaust gas temperature falls outside of the normal operational temperature range of the EGR system, the control system 880 signals the flow regulating device (e.g., valve 852a, 852b and/or positive flow device 860) to recirculate another select amount of exhaust gas through the engine. It is preferable that if the exhaust gas temperature falls outside of the normal operational temperature range of the EGR system, the control system 880 signals the flow regulating device to lower the amount of exhaust to be recirculated through the engine. In one example, the normal operational temperature range of the EGR system is based in part on the operating temperature limits of the diesel engine. In another example, the normal operational temperature range of the EGR system is based in part on the temperatures at which the DPF 856a, 856b will passively regenerate. The control system may further be adapted to signal the flow regulating device to recirculate a select amount of exhaust gas through the engine system based in part on the operational condition of the diesel engine system within a tunnel. In one example, the normal operational temperature range of the EGR system is based in part on the operation of the locomotive in a tunnel.

In another embodiment, a control system 880 monitors the oxygen concentration in the airbox or, alternatively, the exhaust gas oxygen concentration at the exhaust manifold 812 using oxygen concentration sensors 884a, 884b. The control system 880 signals the flow regulating device (e.g., valve 852a, 852b and/or positive flow device 860) to recirculate a select amount of exhaust gas through the engine based on levels of oxygen concentration. In one example, if there is a high oxygen concentration, the control system 880 may be adapted to signal the flow regulating device to increase the amount of exhaust gas to be recirculated through the engine.

In yet another embodiment, a control system 880 monitors ambient temperature using an ambient temperature sensor 886. The control system 880 signals the flow regulating device (e.g., valve 852a, 852b and/or positive flow device 860) to recirculate a select amount of exhaust gas through the engine based on ambient temperature. In one example, if the ambient temperature is lower than a select temperature, the control system 880 may be adapted to signal the flow regulating device to increase the amount of exhaust gas to be recirculated through the engine to at least offset the higher levels of oxygen concentration in the recirculated exhaust gas at lower ambient temperatures.

In yet another embodiment, a control system 880 monitors ambient barometric pressure or altitude using an ambient barometric pressure sensor 888 or an altitude measurement device 890. The control system 880 signals the flow regulating device (e.g., valve 852a, 852b and/or positive flow device 860) to recirculate a select amount of exhaust gas through the engine based on ambient barometric pressure or altitude. In one example, if the barometric pressure is lower than a select value, the control system 880 may be adapted to signal the flow regulating device to decrease the amount of exhaust gas to be recirculated through the engine because there are lower levels of oxygen concentration in the recirculated exhaust gas at lower barometric pressures. Alternatively, if the altitude is lower than a select value, the control system 880 may be adapted to signal the flow regulating device to increase the amount of exhaust gas to be recirculated through the engine because there are higher levels of oxygen concentration in the recirculated exhaust gas at lower altitudes.

In another embodiment, a control system 880 determines and monitors the pressure differential across the DOC/DPF arrangement 854a, 856a, 854b, 856b using pressure sensors 892a, 892b, 894a, 894b. As discussed above, the DOC/DPF arrangement 854a, 856a, 854b, 856b may be adapted to passively regenerate and oxidize soot within the DPF 856a, 856b. However, the DPF 856a, 856b will accumulate ash and some soot, which must be removed in order to maintain the DPF efficiency. As ash and soot accumulates, the pressure differential across the DOC/DPF arrangement 854a, 856a, 854b, 856b increases. Accordingly, the control system 880 monitors and determines whether the DOC/DPF arrangement 854a, 856a, 854b, 856b has reached a select pressure differential at which the DPF 856a, 556b requires cleaning or replacement. In response thereto, the control system 880 may signal an indication that the DPF 856a, 856b requires cleaning or replacement. Alternatively, the control system 880 may signal the flow regulating device to lower recirculation of exhaust gas through the engine. In another embodiment, a control system 880 is shown to be coupled to a DOC/DPF doser 896a, 896b, which adds fuel onto the catalyst for the DOC/DPF arrangement 854a, 856a, 854b, 856b for active regeneration of the filter. The fuel reacts with oxygen in the presence of the catalyst which increases the temperature of the recirculated exhaust gas to promote oxidation of soot on the filter. In another embodiment (not shown), the control system may be coupled to a heating device in the form of a burner or other heating element for controlling the temperature of the recirculated exhaust gas to control oxidation of soot on the filter.

In yet another embodiment, a control system 880 measures the temperature of the exhaust gas downstream of the cooler 858 or the temperature of the coolant in the cooler 858. As shown in FIG. 8, temperature sensors 898a, 898b are provided for measuring exhaust gas temperature downstream of the cooler 858. If the exhaust gas temperature downstream of the cooler 858 or the coolant temperature is within a select temperature range, the control system 880 signals the flow regulating device (e.g., valve 852a, 852b and/or positive flow device 860) to recirculate a select amount of exhaust gas through the engine. If the exhaust gas temperature downstream of the cooler 858 or the coolant temperature falls outside of a select temperature range, the control system 880 signals the flow regulating device to recirculate another select amount of exhaust gas through the engine. In one example, the control system 880 may be adapted to monitor the coolant temperature to determine whether the conditions for condensation of the recirculated exhaust gas are present. If condensation forms, acid condensate may be introduced into the engine system. Accordingly, the control system 880 may be adapted to signal the flow regulating device to lower recirculation of exhaust gas through the engine until the conditions for condensation are no longer present.

In another embodiment, a control system 880 may be adapted to adaptively regulate flow based on the various discrete throttle positions of the locomotive in order to maximize fuel economy, reduce $NO_X$ emissions even further and maintain durability of the EGR system and engine components. For example, the control system 880 may signal the flow regulating device (e.g., valve 852a, 852b and/or positive flow device 860) to lower recirculation of exhaust gas through the engine at low idle, high idle, throttle position 1, throttle position 2 or upon application of dynamic brake. The control system 880 may be adapted to signal the flow regulating device to recirculate exhaust gas through the engine at or above throttle position 3. In one example, the control system 880 may be adapted to increase the amount of exhaust gas to be recirculated through the engine with an increase of throttle position. In yet another embodiment, the control system 880 may be adapted to increase the amount of exhaust gas to be recirculated with additional engine load. Likewise, the control system 880 may be adapted to decrease the amount of exhaust gas to be recirculated with a decreased engine load.

FIGS. 9a-h illustrate an embodiment of an EGR system 950 in accordance with the system outlined in FIG. 4 for use with a two-stroke, 12-cylinder diesel engine system 101 in a locomotive 103. The EGR system 950 is sized and shaped to fit within limited length, width, and height constraints of a locomotive 103. As shown herein, the EGR system 950 is installed within the same general framework of traditional modern diesel engine locomotives. Specifically, the EGR system 950 is generally located in the limited space available between the exhaust manifold 912 of a locomotive engine and the locomotive radiators 980. In this embodiment, the EGR system 950 is shown located generally above the general location of the equipment rack 982. Also, a 12-cylinder locomotive diesel engine may be used instead of a 16-cylinder locomotive diesel engine in order to provide for more space. In an alternative embodiment (not shown), the EGR system 950 may be housed in the locomotive body near the inertial filter.

Generally, the EGR system 950 includes a DOC, DPF and cooler, which are packaged in an integrated EGR module 945. The EGR system 950 further includes a positive flow device 960 interconnected with the EGR module 945. The EGR system 950 receives exhaust gases from the exhaust manifold 912 of the engine 906. A valve 952 is provided between the exhaust manifold 912 and the integrated EGR module 945. The EGR module 945 processes the exhaust gases therein. The positive flow device 960 compresses the processed exhaust gas to be recirculated and introduces such upstream of the aftercooler 920 by mixing the recirculated exhaust gases with the fresh charge air from the turbocharger 900, and delivers the mixture of fresh charge air and recirculated exhaust gas to the airbox 908, as fully discussed with respect to the embodiment of FIG. 4. In this system, only a select percentage of the exhaust gases is recirculated and mixed with the intake charge air in order to selectively reduce pollutant emissions (including $NO_X$) while achieving desired fuel efficiency. Although the EGR system 950 is an implementation of the system embodiment of FIG. 4, it may be adapted to be an implementation of any of the other previous EGR system embodiments discussed herein. For example, instead of introducing the recirculated exhaust gas upstream of the aftercooler, as described with respect to the embodiments of FIGS. 4 and 9, the recirculated exhaust gas may be introduced downstream of the aftercooler as discussed with respect to FIG. 3.

The integrated EGR module 945 includes a section 962 having an inlet 964 for receiving exhaust gases from the exhaust manifold 912. Specifically, the inlet section 962 of the EGR module 945 is interconnected with the exhaust manifold 912 of the engine 906. A valve 952 is provided between the exhaust manifold 912 and the inlet section 962 of the EGR module 945. In one example, the valve 952 is adaptable for determining the amount of exhaust gases to be recirculated through the engine 906. In another example, the valve 953 may act as an on/off valve for determining whether gases are to be recirculated through the engine 906.

Having received exhaust gas, the inlet section 962 of the EGR module 945 directs exhaust gases into a section which houses at least one diesel oxidation catalyst/diesel particulate filter (DOC/DPF) arrangement 953. Each DOC 954 uses an oxidation process to reduce the particulate matter, hydrocarbons and carbon monoxide emissions in the exhaust gases. Each DPF 956 includes a filter to reduce diesel particulate matter (PM) or soot from the exhaust gases. Oxidation and filtration is specifically used in this embodiment to reduce the particulate matter that will be introduced into engine 906 during recirculation. The introduction of particulates into the engine 906 causes accelerated wear especially in uniflow two-stroke diesel engine applications. Oxidation and filtration may also be used to prevent fouling and wear of other EGR system components (e.g., cooler 958 and positive flow device 960) or engine system components.

The DOC/DPF arrangement 953 is designed, sized and shaped such that they effectively reduce particulate matter under the operating parameters of the EGR system 950, fit within the limited size constraints of the locomotive 103, have a reasonable pressure drop across their substrates, and have a manageable service interval.

It is desirable that the DOC/DPF arrangement 953 reduces the PM in the exhaust gas by over 90% under the operating parameters of the EGR system 950. Specifically, the composition of the substrates and coatings thereon are chosen of the DOC/DPF arrangement 953 to efficiently reduce particulate matter. In one example of a 12-cylinder uniflow scavenged two-stroke diesel engine at about 3,200 bhp with less than 20% exhaust gas being recirculated at full load, the DOC/DPF arrangement 953 is selected to manage and operate a mass flow of exhaust gas of from about 1.5 to about 2.5 lbm/s, having an intake temperature ranging from about 600° F. to about 1,050° F., and an intake pressure of about 80 inHga to about 110 inHga. It is further preferable that the DOC/DPF arrangement 953 can handle a volumetric flow rate across both the DOC/DPF from about 1,000 CFM to about 1,300 CFM. Furthermore, the DOC/DPF arrangement 953 is further designed to endure an ambient temperature range of about −40° C. to about 125° C.

The DOC/DPF arrangement 953 is generally packaged such that it fits within the size constraints of the locomotive 103. As shown in this embodiment, each DOC 954 and DPF 956 is packaged in a cylindrical housing similar to those commonly used in the trucking industry. Each DOC 954 and DPF 956 has a diameter of about 12 inches. The length of each DOC 954 is about 6 inches, whereas the length of each DPF 956 is about 13 inches. The DOC 954 and DPF 946 are integrated within the EGR module 945 such that they are able to fit within the size constraints of the locomotive.

It is further desirable that the DOC/DPF arrangement 953 is selected to have a reasonable pressure drop across their substrates. As discussed above, it is preferable that the exhaust gas is introduced into a region of higher pressure. Accordingly, it is desirable to minimize the pressure drop across the DOC/DPF arrangement 953. In one embodiment, it is desirable for the pressure drop across both substrates to be less than about 20 $inH_2O$.

Finally, it is desirable that the DOC/DPF arrangement 953 has a manageable service life. The DOC/DPF arrangement 953 accumulates ash and some soot, which is preferably discarded in order to maintain the efficiency of the DOC 954 and the DPF 956. In one example, the service interval for cleaning of the DOC/DPF arrangement 953 may be selected at about 6 months. As shown in the embodiments, each DOC 954 and DPF 956 is housed in separate but adjoining sections of the EGR module 945 such that they are removable for cleaning and replacement. For maintenance, the DOC/DPF arrangement 953 includes a flange 966 for mounting the DOC/DPF arrangement 953 together with the inlet section 962 of the EGR module 945 to the cooler 958. The fasteners associated with the mounting flange 966 of the DOC/DPF arrangement 953 may be removed such that the DOC/DPF arrangement 953 together with the inlet section 962 of the EGR module 945 may be removed from the cooler 958 and the locomotive. Thereafter, the inlet section 962, the DOC 954, and the DPF 956 may be selectively disassembled for service via flanges 968, 970. In order to facilitate serviceability, the fasteners for flanges 968, 970 are offset from the DOC/DPF arrangement 953 mounting flange 966. Accordingly, the DOC/DPF arrangement 953 together with the inlet section 962 may be removed via its mounting flange 966 without first disassembling each individual section.

In order to meet the operational and maintainability requirements of the EGR system 950, a plurality of DOCs and DPFs are paired in parallel paths. For example, as shown, two DOC/DPC arrangement pairs are shown in parallel in this embodiment in order to accommodate the flow and pressure drop requirements of the EGR system 950. Moreover, the DOC/DPF arrangement pairs in parallel provide for reasonable room for accumulation of ash and soot therein. Nevertheless, more or less DOC/DPF arrangement pairs may be placed in a similar parallel arrangement in order to meet the operational and maintainability requirements of the EGR system 950.

The integrated EGR module 945 further includes a cooler 958 interconnected to the DOC/DPF arrangement 953. The cooler 958 decreases the filtered exhaust gas temperature, thereby providing a denser intake charge to the engine 906. In one example of a cooler 958 for a 12-cylinder uniflow scavenged two-stroke diesel engine at about 3200 bhp with less than 20% exhaust gas being recirculated at full load, each DPF 956 extends into the cooler 958 and provides filtered exhaust gas at a mass flow of about 1.5 lbm/s to about 2.5 lbm/s; a pressure of about 82 inHga to about 110 inHga; and a density of about 0.075 lbm/ft$^3$ to about 0.15 lbm/ft$^3$. It is desirable that the cooler 958 reduces the temperature of the filtered exhaust gas from a range of about 600° F.-1,250° F. to a range of about 200° F.-250° F. at an inlet volumetric flow rate of about 1,050 CFM to about 1,300 CFM. The source of the coolant for the cooler 958 may be the water jacket loop of the engine, having a coolant flow rate of about 160 gpm to about 190 gpm via coolant inlet 972. It is further desirable that the cooler 958 maintains a reasonable pressure drop therein. As discussed above, the exhaust gas is introduced into a region of higher pressure. Accordingly, it is desirable to minimize the pressure drop within the cooler 958. In one embodiment, it is desirable for the pressure drop across the cooler to be from about 3 inH$_2$O to about 6 inH$_2$O.

The cooler 958 is generally packaged such that it fits within the size constraints of the locomotive 103. As shown in this embodiment, the cooler 958 is integrated with the DOC/DPF arrangement 953. The cooler 958 has a frontal area of about 25 inches by 16 inches, and a depth of about 16 inches.

The EGR module 945 is connected to a positive flow device 960 via the outlet 974 from the cooler 958. The positive flow device 960 regulates the amount of cooled, filtered exhaust gas to be recirculated and introduced into the engine 906 at the aftercooler 920 upstream of its core via ducts 976. Specifically, the positive flow device 960 is illustrated as a variable speed roots style blower, which regulates the recirculation flow rate by adapting the circulation speed of the device through its inverter drive system. Specifically, by varying the speed of the positive flow device 960, a varying amount of exhaust gas may be recirculated. Other suitable positive flow devices may be implemented in order to similarly regulate the amount of exhaust gases to be recirculated.

Figure 10:
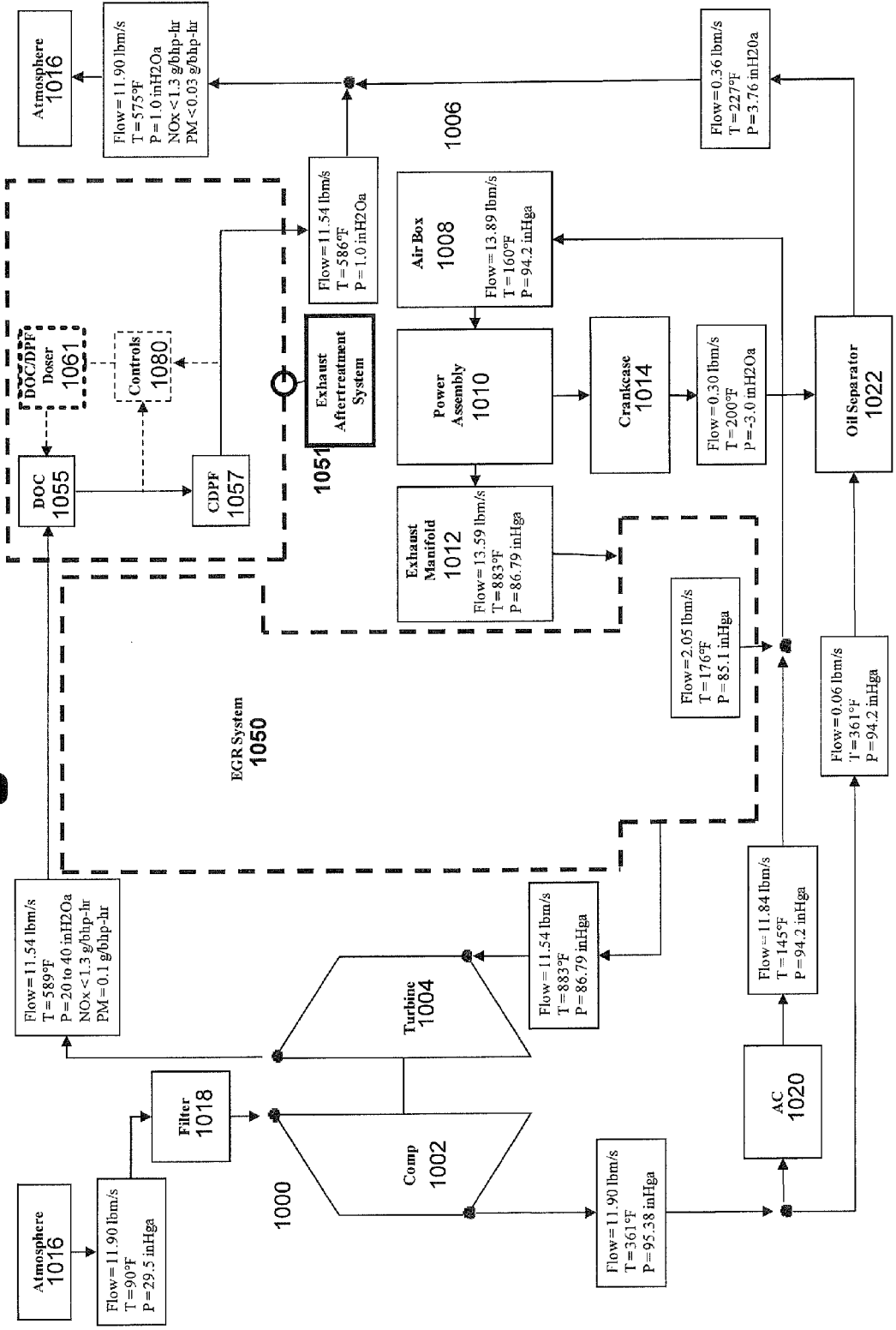
FIG. 10 is a system diagram of a two-stroke diesel engine having an exhaust aftertreatment system and an EGR system.

As shown in FIG. 10, an exhaust aftertreatment system 1051 similar to that shown and described with respect to FIG. 2a may be used in conjunction with an EGR system to reduce exhaust emissions. The EGR system 1050 may be similar to those shown and described with respect to any of FIGS. 3-9. Specifically, the exhaust aftertreatment system 1051 may be adapted to reduce particulate matter (PM), hydrocarbons and/or carbon monoxide emissions. In this particular arrangement, the exhaust aftertreatment system 1051 further includes a generally includes a filtration system 1055/1057 similar to that shown and described with respect to FIG. 2a. More specifically, the exhaust aftertreatment system 1051 includes a diesel oxidation catalyst (DOC) 1055, a diesel particulate filter (DPF) 1057, a control system (for filtration monitoring and/or control) 1080 and DOC/DPF doser 1061 similar to that shown and described with respect to FIG. 2a.

Figure 11:
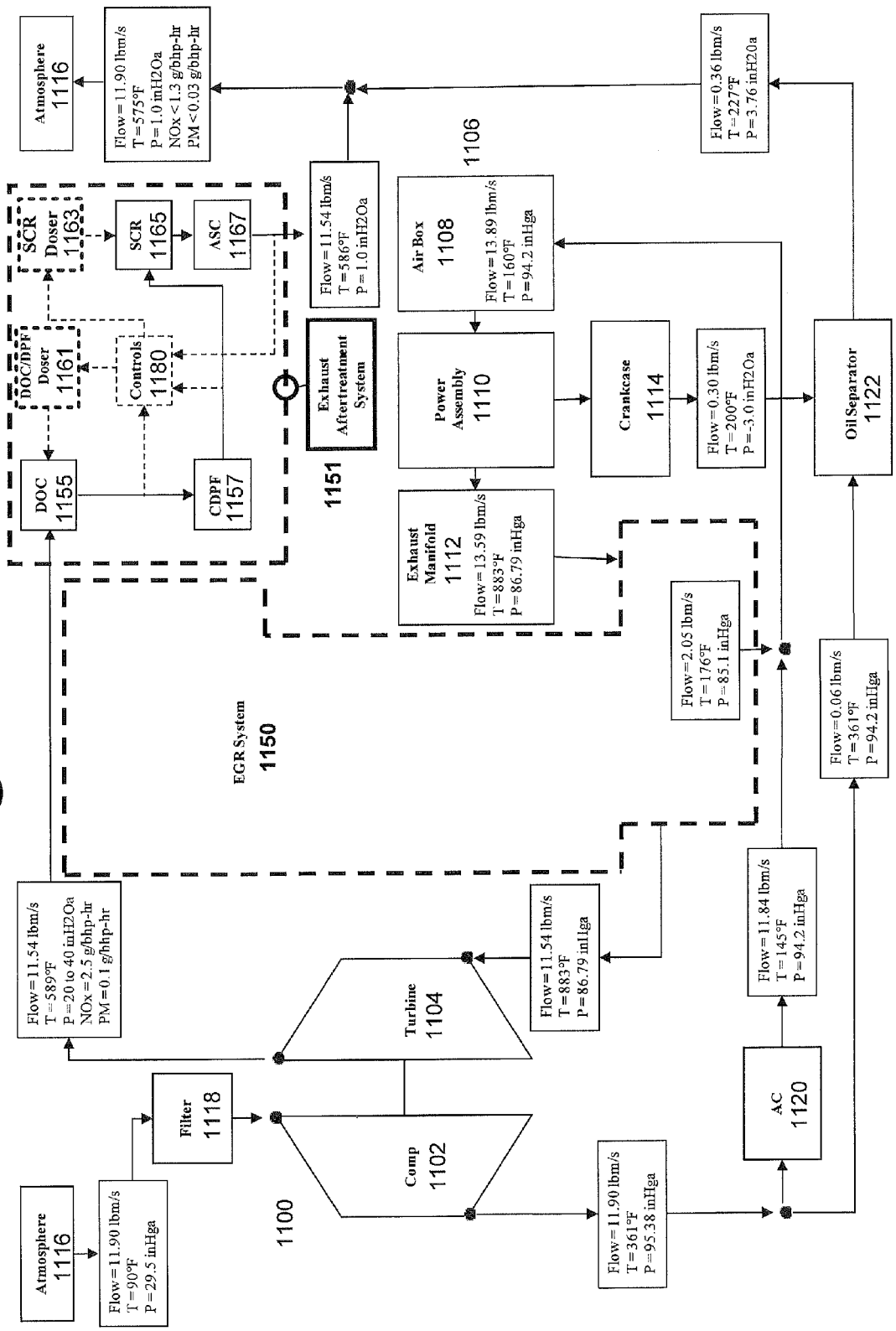
FIG. 11 is a system diagram of a two-stroke diesel engine having an EGR system and an exhaust aftertreatment system including a selective catalytic reduction catalyst and ammonia slip catalyst.

As shown in FIG. 11, an exhaust aftertreatment system 1151 similar to that shown and described with respect to FIGS. 2b and 2c may be used in conjunction with an EGR system to reduce exhaust emissions. The EGR system 1150 may be similar to those shown and described with respect to any of FIGS. 3-9. Specifically, the exhaust aftertreatment system 1151 may be adapted to reduce NO$_X$ in addition to particulate matter (PM), hydrocarbons and/or carbon monoxide emissions. In this particular arrangement, the exhaust aftertreatment system 1151 generally includes a filtration system and SCR system similar to that shown and described with respect to FIGS. 2b and 2c. More specifically, the exhaust aftertreatment system 1151 includes a diesel oxidation catalyst (DOC) 1155, a diesel particulate filter (DPF) 1157, a control system (for filtration and SCR monitoring and/or control) 1180 and DOC/DPF doser 1161 similar to that shown and described with respect to FIG. 2a. Additionally, the exhaust aftertreatment system 1151 of FIG. 11 further includes a selective catalytic reduction (SCR) catalyst 1165, ammonia slip catalyst (ASC) 1167, and an SCR doser 1163 adapted to lower NO$_X$ emissions of the engine 1106.

FIGS. 12a-12l illustrate an embodiment of an exhaust aftertreatment system 1251 in accordance with the system outlined in FIGS. 2b, 2c and 11 for use with a locomotive 103. The exhaust aftertreatment system 1251 is adapted to reduce NO$_X$ in addition to particulate matter (PM), hydrocarbons and/or carbon monoxide emissions. In this particular arrangement, the exhaust aftertreatment system 1251 generally includes a plurality of filtration systems 1255/1257, each being situated inline with a NO$_X$ reduction system 1265/1267.

The exhaust aftertreatment system 1251 includes a turbocharger mixing manifold 1211 for receiving exhaust expelled from the engine 1206 and, specifically, the turbocharger 1200.

Multiple discrete aftertreatment line assemblies 1268-1271 are provided in order to accommodate and treat the exhaust gas from the engine 1206. Specifically, the exhaust gas from the engine 1206 is separated based on specific operating parameters of each of the inline filtration systems 1255/1257 and NO$_X$ reduction systems 1265/1267, described below. As shown herein, the turbocharger mixing manifold 1211 separates and guides the exhaust gas into a plurality of discrete exhaust aftertreatment line assemblies 1268-1271 to promote uniform distribution of exhaust gas into the subsequent inline filtration system 1255/1257 and NO$_X$ reduction system 1265/1267 of the exhaust aftertreatment system 1251. The arrangement of discrete aftertreatment line assemblies 1268-1271 further promotes thermal isolation and distribution of mass loading of the exhaust aftertreatment system 1251.

The exhaust gas in each of the exhaust aftertreatment line assemblies 1271 is then further distributed into a plurality of discrete exhaust gas lines 1272-1274 via line assembly distribution manifolds 1285-1288. Each of the discrete exhaust gas lines 1272-1274 comprises an inline filtration system 1255/1257 and a NO$_X$ reduction system 1265/1267.

Each inline filtration system 1255/1257 includes a DOC/DPF arrangement to reduce particulate matter (PM), hydrocarbons and/or carbon monoxide emissions exhaust gas. As shown herein, and specifically illustrated in FIG. 12h, the housing section associated with the DPF 1257 facilitates the removal of the DPF 1257 filters for cleaning and maintainability DOC/DPF dosers (e.g., hydrocarbon injectors) may be provided to add a select amount of fuel into the exhaust stream at the turbocharger mixing manifold 1211. The DOC/DPF dosers may be arranged with respect to the turbocharger mixing manifold 1211 to facilitate delivery of fuel to the exhaust contained within the turbocharger mixing manifold 1211 and promote mixing therein. The DOC/DPF dosers may be situated in a common rail or single line system. The operation of the DOC/DPF doser may be controlled by a control system as described with respect to the embodiment described in FIGS. 2b and 2c. The fuel reacts with oxygen in the presence of the catalyst, which increases the temperature of the exhaust gas to promote oxidation of soot on the filter of the DOC/DPF arrangement 1255/1257. The turbocharger mixing manifold 1211 may further be sized and shaped to serve as a mixing chamber, promote mixing of fuel and exhaust, and uniformly distribute this mixture to the remainder of the exhaust aftertreatment system 1251. In yet another embodiment (not shown), mixing elements may be included to promote mixing in the turbocharger mixing manifold 1211 or elsewhere upstream of the DOC/DPF arrangement 1255/1257.

Thereafter, the filtered exhaust gas is then mixed with an SCR reductant fluid or SCR reagent (e.g., urea-based, diesel exhaust fluid, ammonia or hydrocarbon) in a line leading to a $NO_X$ reduction system 1289. For example, the SCR reductant fluid or SCR reagent may be introduced by an SCR doser upstream of the SCR 1265 (e.g., mixing region at 1273). The SCR reductant fluid or SCR reagent is preferably introduced to each of the of the exhaust aftertreatment line assemblies 1268-1271 using a common rail or single line system. The operation of the SCR doser may be controlled by a control system as described with respect to the embodiment described in FIG. 2b. Upon injection of the SCR reductant fluid or SCR reagent, the $NO_X$ from the filtered exhaust reacts with the SCR reductant fluid or SCR reagent over the catalyst in the SCR 1265 and ASC 1267 to form nitrogen and water. Although a urea-based SCR 1265 is shown, other SCR's known in the art may also be used (e.g., hydrocarbon based SCR's, De-$NO_X$ systems, etc.). The exhaust is then released into the atmosphere via a plurality of exhaust stacks 1224-1227.

In yet another embodiment, an optional heating device, such as a burner, or other heating element, may be used to control the temperature of the exhaust at the exhaust aftertreatment system 1251 turbocharger mixing manifold 1211 to control oxidation of soot on the filter of the DOC/DPF arrangement 1255/1257. For example, as shown in FIGS. 12b-12e, exhaust burner lines 1259 from the engine upstream of the turbocharger 1200 (e.g., from the engine exhaust manifold 1212) are shown in communication with the exhaust aftertreatment system 1251 via the turbocharger mixing manifold 1211 to direct a select amount of exhaust directly from the engine (e.g., from the engine exhaust manifold 1212) to a heating device in the form of a burner (shown at 1293) or other heating element, and then to the turbocharger mixing manifold 1211 of the exhaust aftertreatment system 1251 (see also FIG. 12k). The select amount of exhaust is heated to a select temperature and introduced into the exhaust stream at the turbocharger mixing manifold 1211. The select amount of exhaust is preferably introduced upstream of the location of the DOC/DPF doser. The heated exhaust is mixed with the exhaust in the turbocharger mixing manifold 1211 to achieve a temperature of between about 240° C. and about 280° C., and preferably about 280° C., at which oxidation of soot on the filter of the DOC/DPF arrangement 1255/1257 is promoted. The operation of the optional heating device may be controlled by a control system as described with respect to the embodiment described in FIGS. 2b and 2c.

Figure 12C:
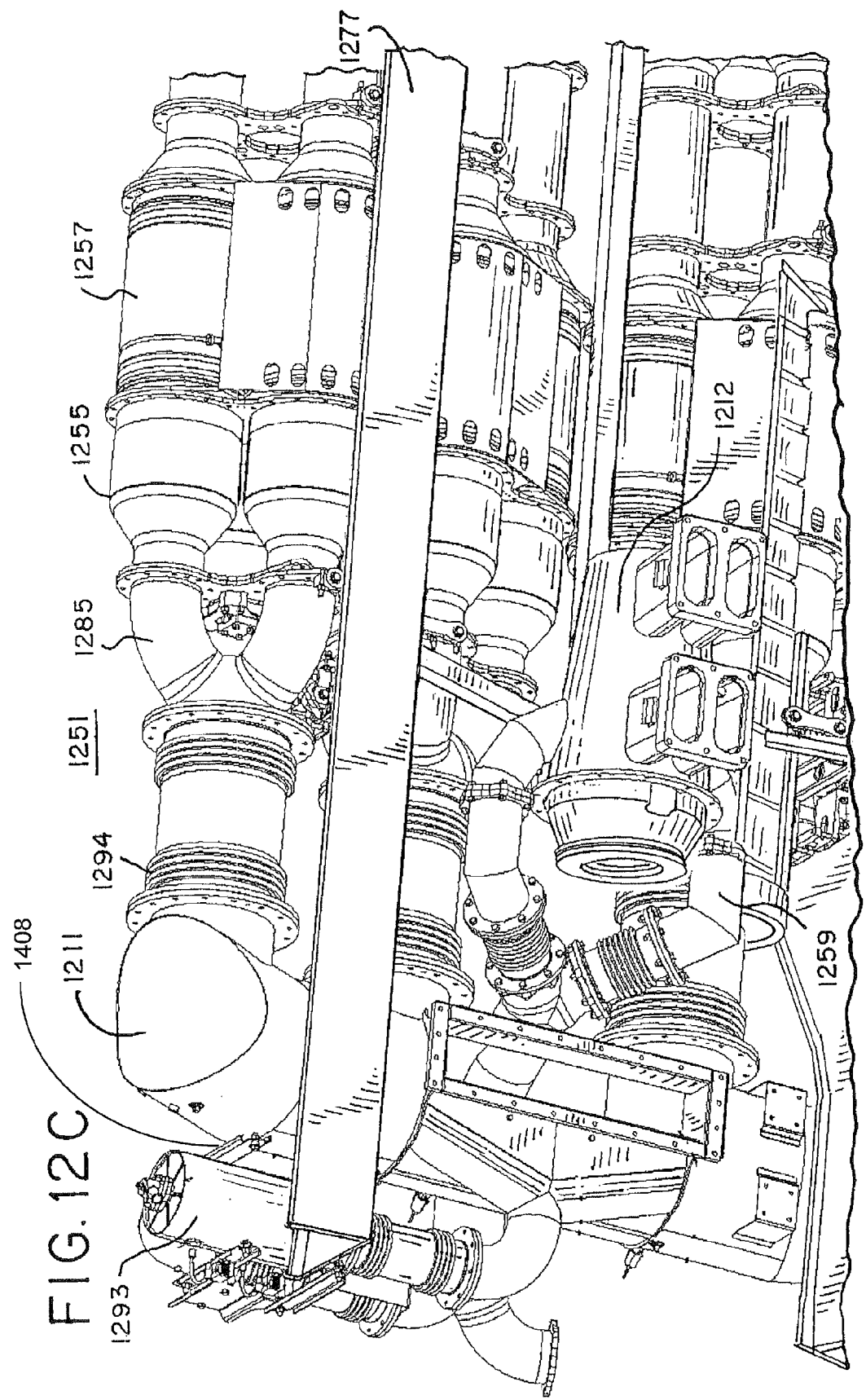
Figure 12D:
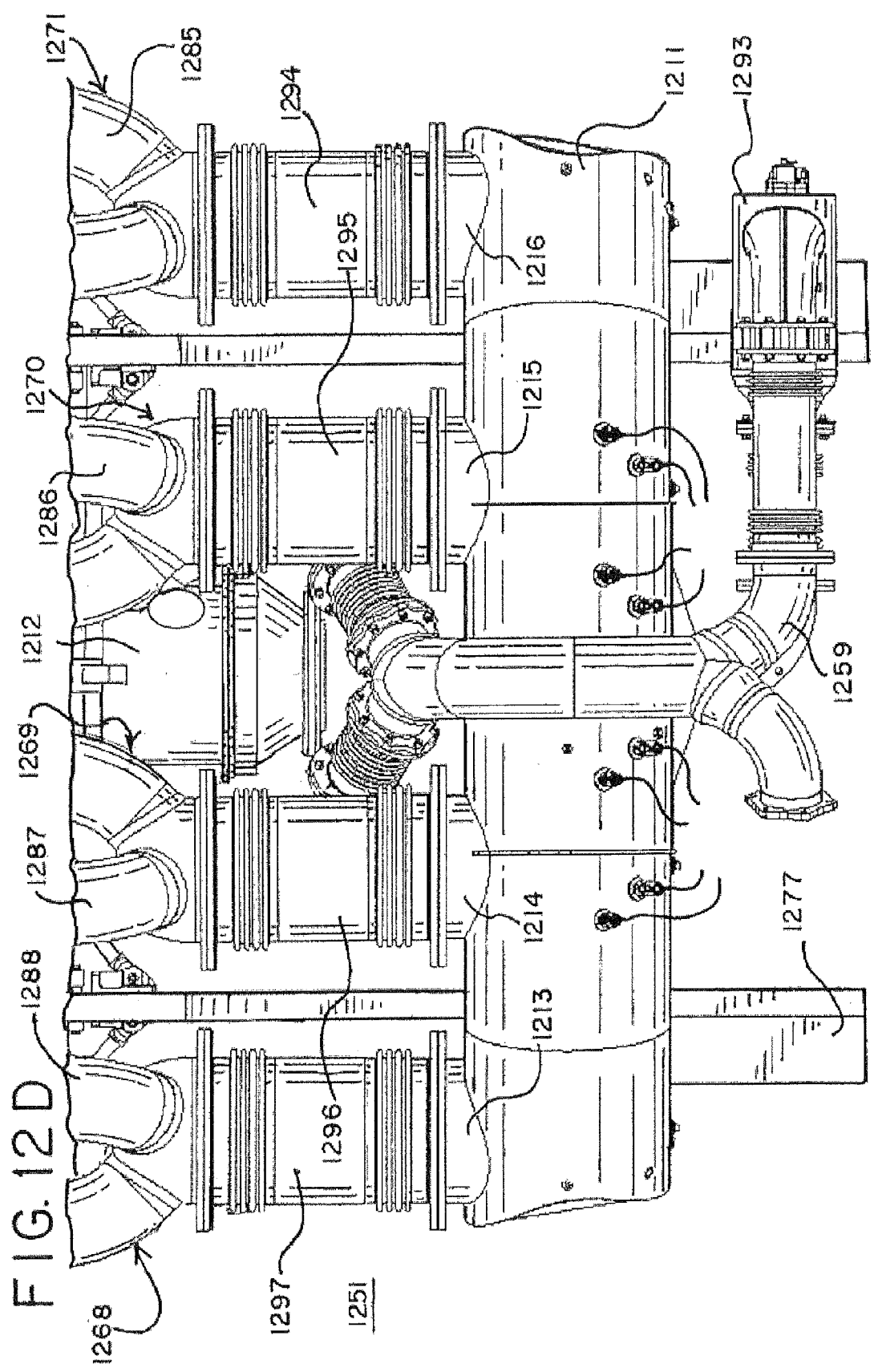
Figure 12E:
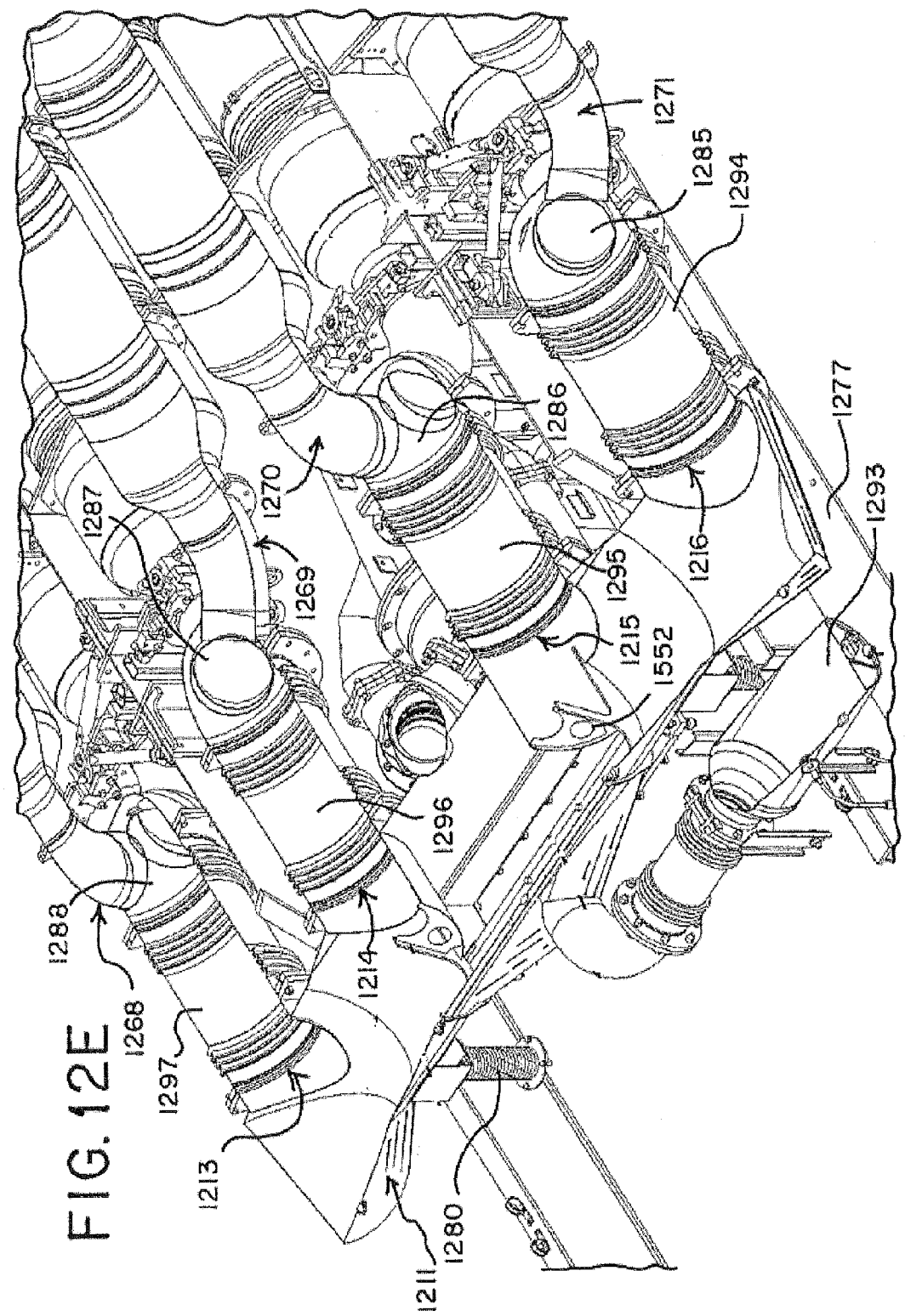
Figure 12F:
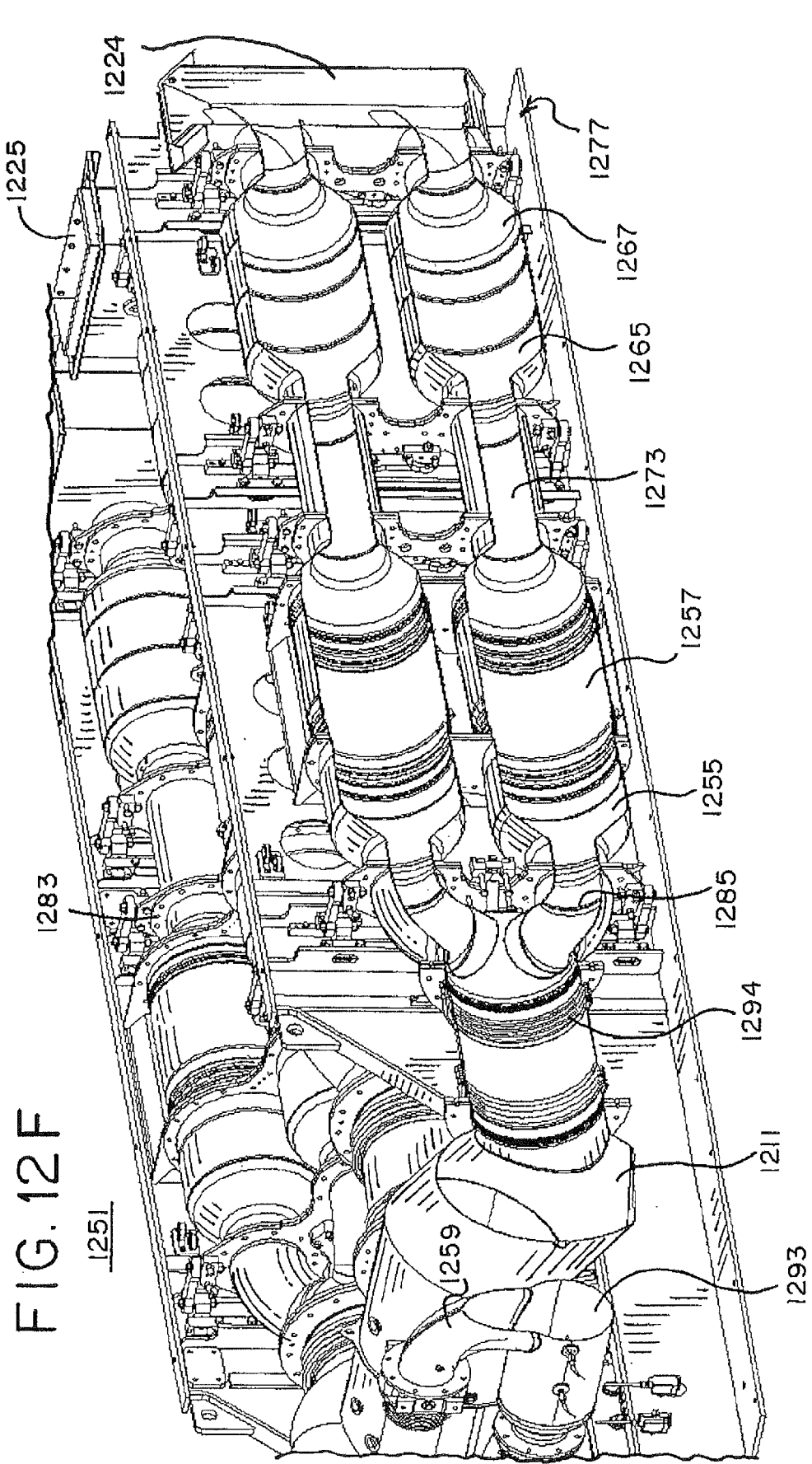
FIG. 12f is a side view of the embodiment of the exhaust aftertreatment system of FIG. 12a, showing the individual exhaust aftertreatment line assemblies thereof.
Figure 12G:
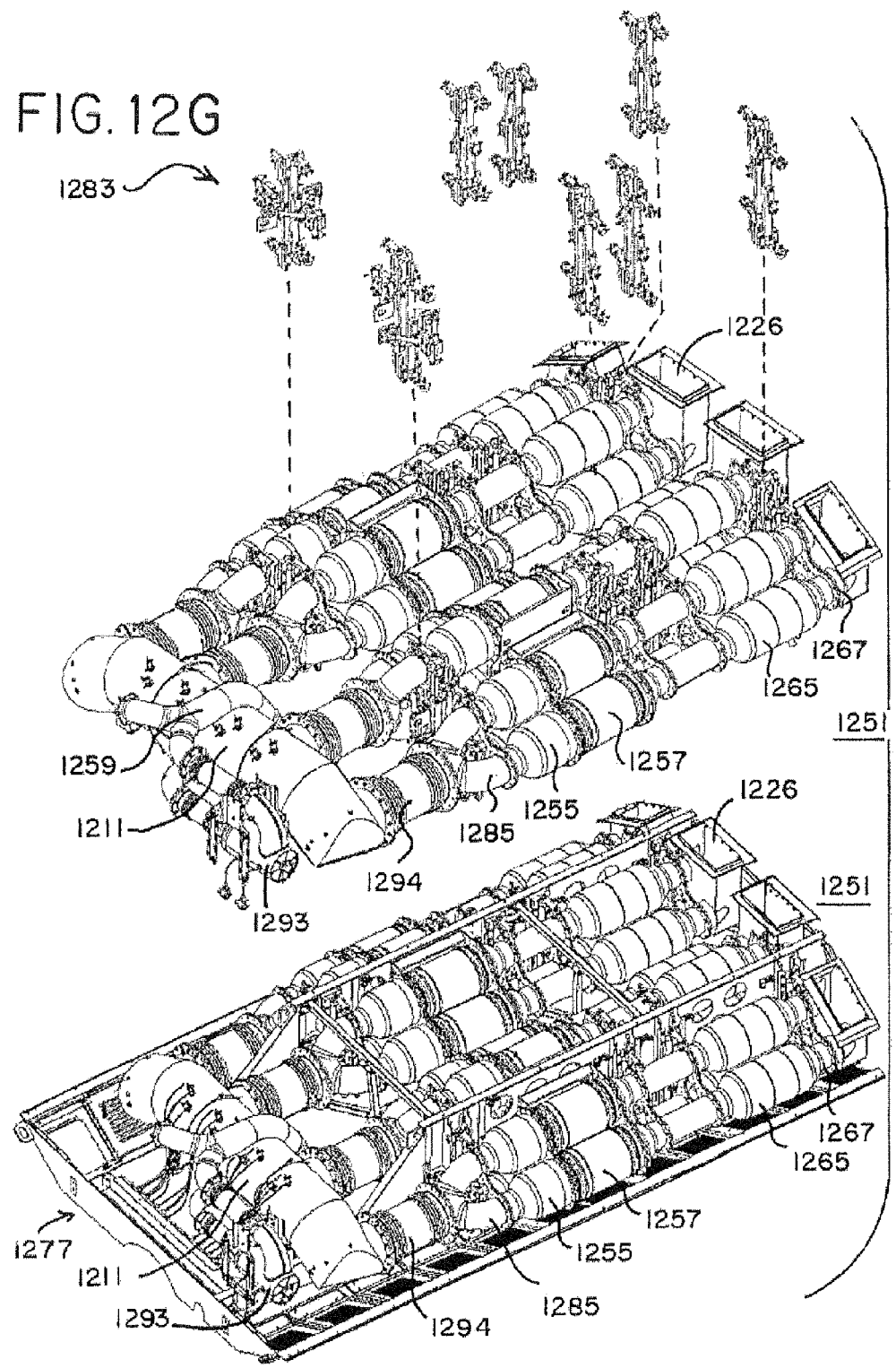
FIG. 12g is an exploded perspective view of an embodiment of the exhaust aftertreatment system of FIG. 12a including a connection system.
Figure 12H:
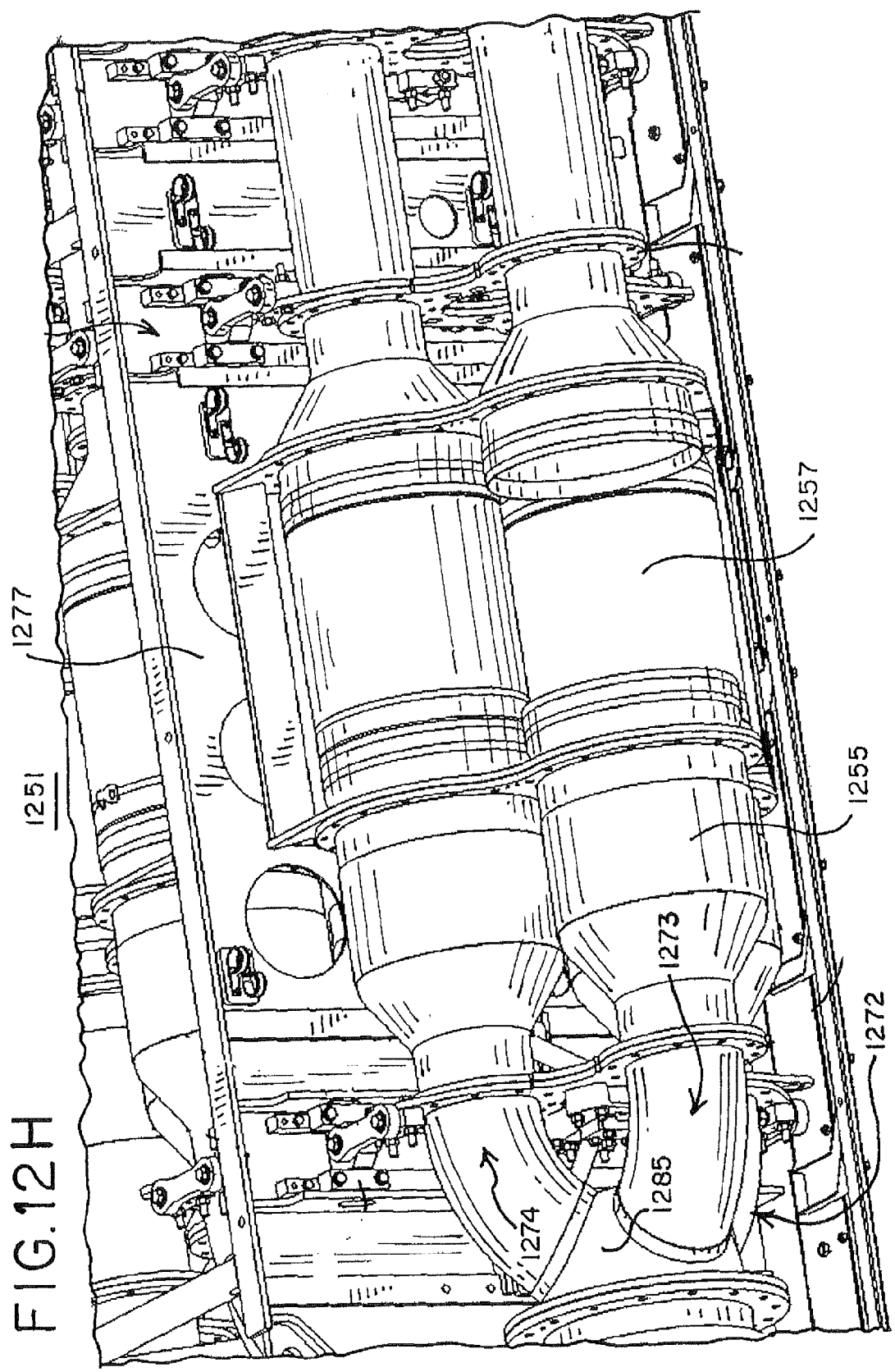
FIG. 12h is a detailed side view of the embodiment of the exhaust aftertreatment system of FIG. 12a including a connection system.

The pressure and mass flow of exhaust exiting the turbocharger stack is generally non-uniform and varies based on throttle position of the locomotive. However, it is preferable that the pressure and mass flow of exhaust to each inline filtration system 1255/1257 and $NO_X$ reduction system 1265/1267 be uniform. Accordingly, the turbocharger mixing manifold 1211 may further be sized and shaped to stabilize the exhaust airflow and promote uniform exhaust airflow to each inline filtration 1255/1257 and $NO_X$ reduction system 1265/1267. Accordingly, as shown in FIG. 12g, the turbocharger mixing manifold 1211 is sized and shaped such that the exhaust generally enters a volume (or static box), which is greater than the turbocharger exit. Specifically, exhaust gas from the turbocharger 1210 enters the mixing chamber that has a volume greater than the volume of the mixing manifold intake (see, FIG. 12e). This larger volume stabilizes (or slows) the exhaust airflow and allows it to homogenize such that it may then uniformly enter into to the individual exhaust aftertreatment line assemblies 1268-1271, each including an inline filtration system 1255/1257 and $NO_X$ reduction system 1265/1267.

The exhaust aftertreatment system 1251 is sized and shaped to fit within limited length, width, and height constraints of a locomotive 103. As shown herein, the exhaust aftertreatment system 1251 is installed within the same general framework of traditional modern diesel engine locomotives. In the embodiment shown (see FIGS. 12a, 12b and 12l), the exhaust aftertreatment system 1251 is generally located in the limited space available above the locomotive engine 1206 within the locomotive car body frame 1275.

Figure 12I:
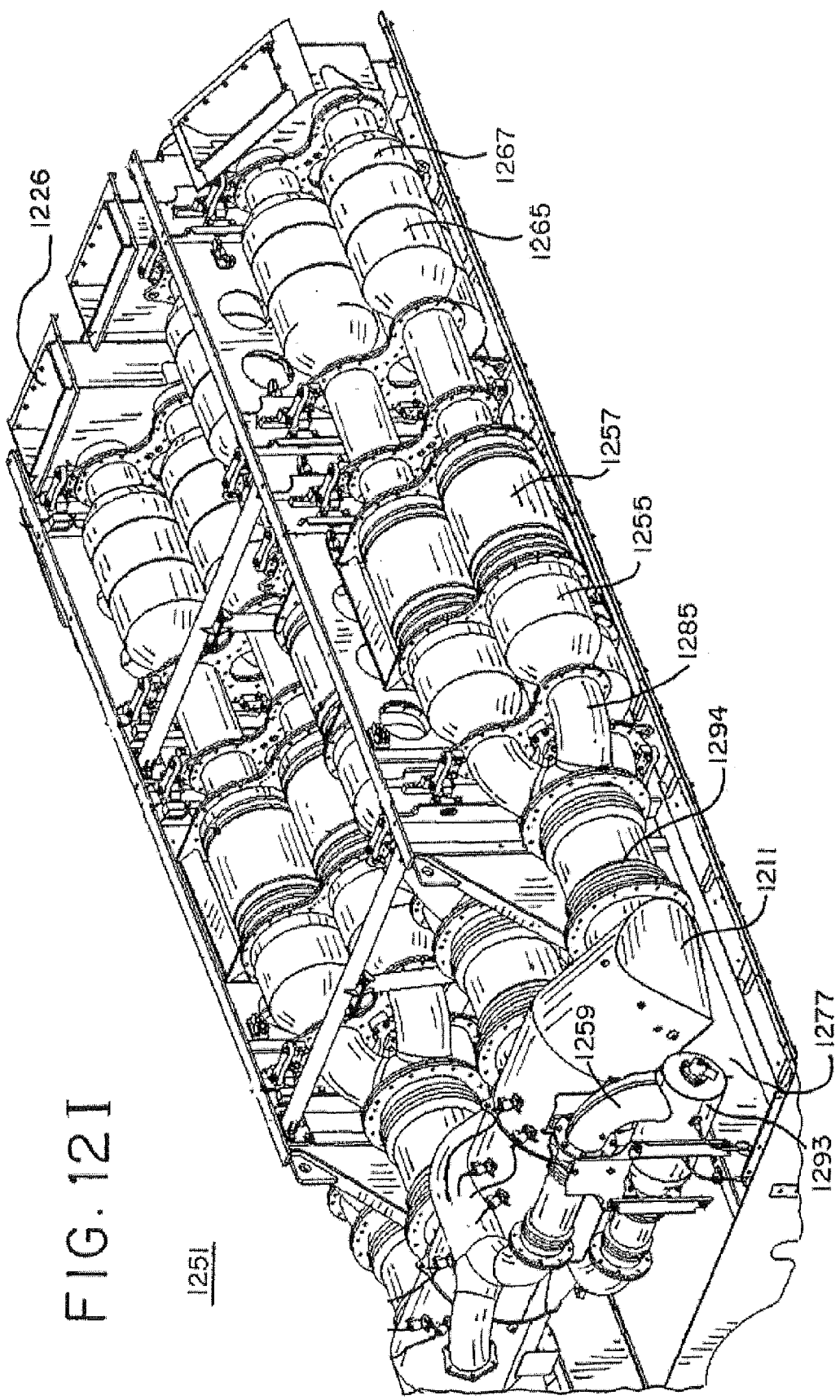
FIG. 12*i* is a perspective view of the embodiment of the exhaust aftertreatment system of FIG. 12*a* including a support structure.
Figure 12J:
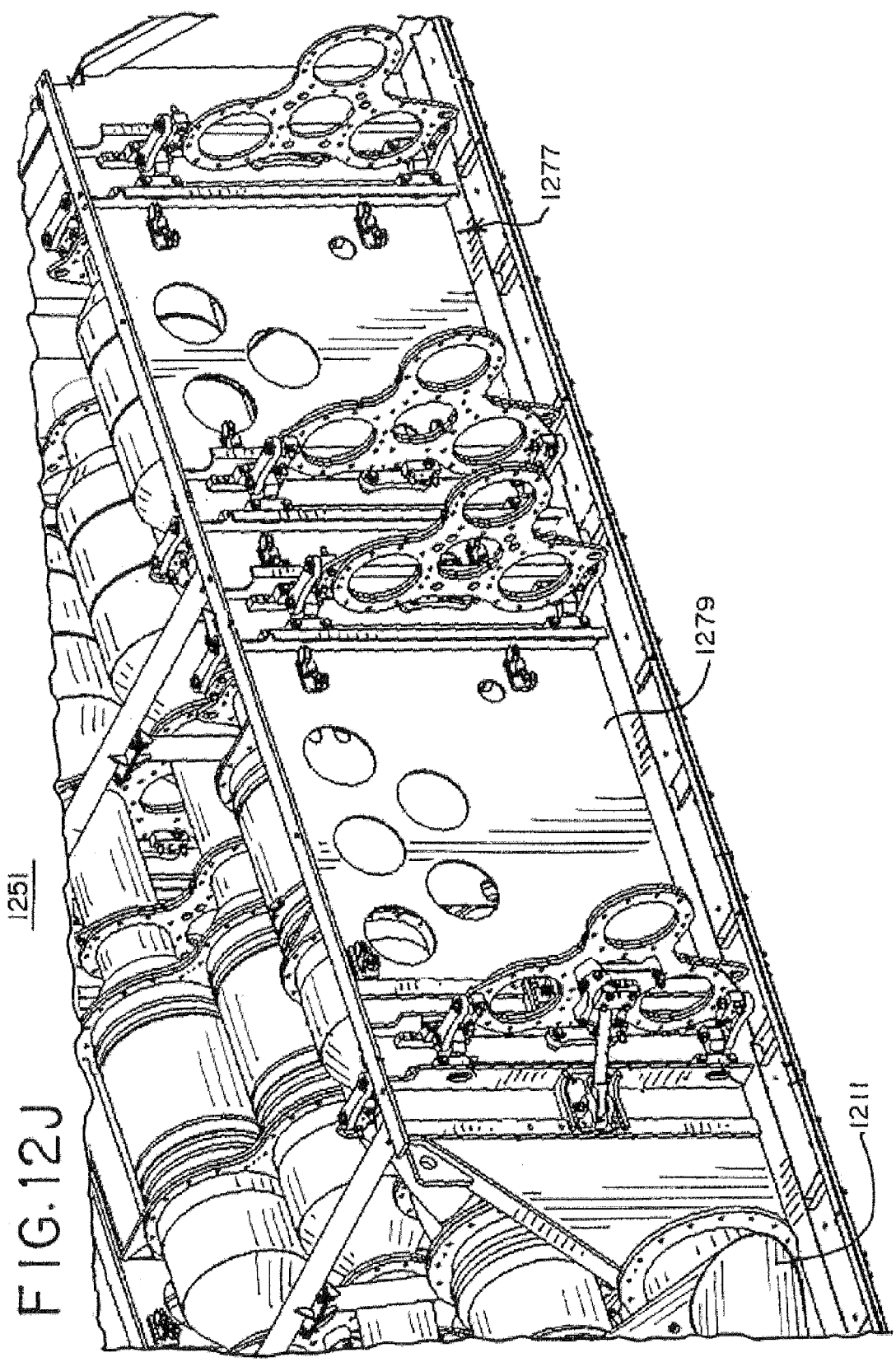
FIG. 12*j* is a side perspective view of the embodiment of the exhaust aftertreatment system of FIG. 12*a* including a support structure and connection system.
Figure 12K:
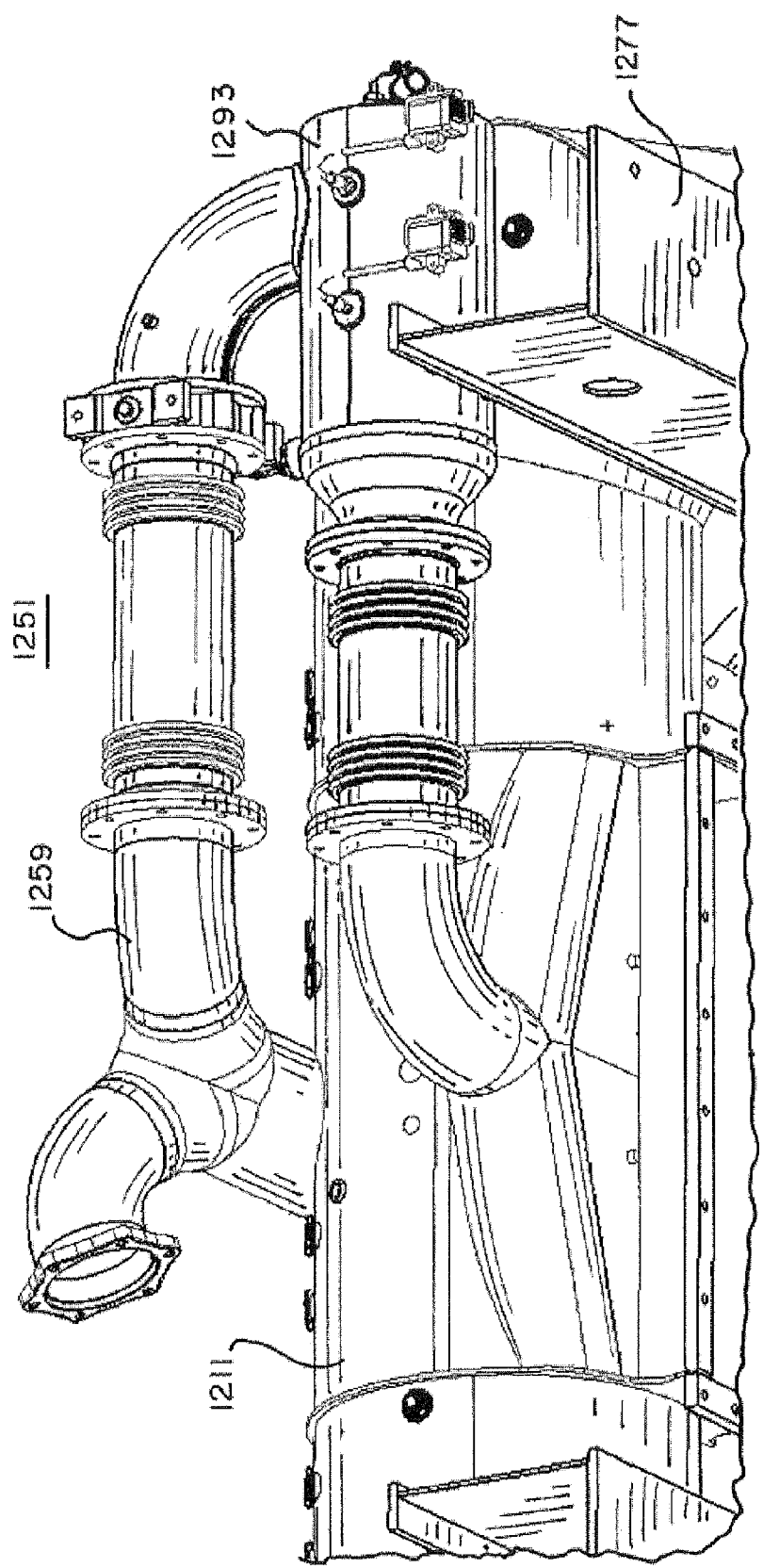
FIG. 12*k* is a detailed perspective view of the embodiment of the exhaust aftertreatment system of FIG. 12*a* showing a burner.

The exhaust aftertreatment system 1251 is constructed to withstand the operational loading environment of the locomotive 103. Specifically, it is required that the exhaust aftertreatment system 1251 be connected to the engine 1206 (and specifically the turbocharger stack) to receive exhaust therefrom. However, the engine 1206 cannot support the mass load of the exhaust aftertreatment system 1251. It is therefore preferable that the mass load of the exhaust aftertreatment system 1251 be supported by the locomotive body frame 1275 via a support structure 1277 including a plurality of support beams 1279, rather than the engine 1206. At the same time, as illustrated in FIGS. 12i and 12j, it is preferable that the operational loads associated with the engine 1206 are isolated from the operational loads associated with the locomotive structure. A hood 1291 may also be provided having a ventilation system for releasing heat created by the exhaust aftertreatment system 1251.

The various embodiments of the present disclosure may be applied to both low and high pressure loop EGR systems. The various embodiments of the present disclosure may be applied to locomotive two-stroke diesel engines may be applied to engines having various numbers of cylinders (e.g., 8 cylinders, 12 cylinders, 16 cylinders, 18 cylinders, 20 cylinders, etc.). The various embodiments may further be applied to other two-stroke uniflow scavenged diesel engine applications other than for locomotive applications (e.g., marine applications).

As discussed above, $NO_X$ reduction is accomplished through the exhaust aftertreatment system while the new engine components maintain the desired levels of cylinder scavenging and mixing in a uniflow scavenged two-stroke diesel engine. The scavenging and mixing processes may be further enhanced by adjusting the intake port timing, intake port design, exhaust valve design, exhaust valve timing, exhaust aftertreatment system design, EGR system design, engine component design and turbocharger design.

The various embodiments of the present disclosure may be applied to both low and high pressure loop EGR systems. The various embodiments of the present disclosure may be applied to locomotive two-stroke diesel engines may be applied to engines having various numbers of cylinders (e.g., 8 cylinders, 12 cylinders, 16 cylinders, 18 cylinders, 20 cylinders, etc.). The various embodiments may further be applied to other two-stroke uniflow scavenged diesel engine applications other than for locomotive applications (e.g., marine applications).

While this system and method has been described with reference to certain illustrative aspects, it will be understood that this description shall not be construed in a limiting sense. For example, the various operating parameters or values described herein exemplify representative values for the present system operating under certain conditions. Accordingly, it is expected that these values will change according to different locomotive operating parameters or conditions. Rather, various changes and modifications can be made to the illustrative embodiments without departing from the true spirit, central characteristics and scope of the disclosure, including those combinations of features that are individually disclosed or claimed herein.

Furthermore, it will be appreciated that any such changes and modifications will be recognized by those skilled in the art as an equivalent to one or more elements of the following claims, and shall be covered by such claims to the fullest extent permitted by law. For example, the various operating parameters or values described herein exemplify representative values for the present system operating under certain conditions. Accordingly, it is expected that these values will change according to different locomotive operating parameters or conditions. In another example, although a urea-based SCR is shown, other SCR's known in the art may also be used (e.g., hydrocarbon based SCR's, De-$NO_X$ systems, etc.).

What is claimed is:

1. An exhaust aftertreatment system for reducing emissions in exhaust expelled from an engine of a locomotive, the exhaust aftertreatment system comprising:
   a manifold adapted to receive exhaust from the locomotive engine,
   a burner coupled to the engine for heating at least a portion of the exhaust entering the manifold,
   a valve for regulating the amount of exhaust delivered to the burner, wherein said manifold is sized and shaped to promote mixing of the exhaust from the locomotive engine and the portion of heated exhaust from the burner,
   a filtration system coupled to the manifold including a catalyst and a filter adapted to filter particulate matter from the exhaust,
   a DOC/DPF doser configured to add a select amount of fuel to the mixture of exhaust from the locomotive engine and the portion of heated exhaust from the burner, and wherein the fuel and exhaust mixture reacts with oxygen in the presence of the catalyst to promote oxidation of soot on the filter,
   a controller configured to monitor exhaust temperature at the filtration system, said controller being coupled to the valve for adaptively controlling a select volume of exhaust to be delivered to the burner and being coupled to the burner for adaptively heating such select volume of exhaust to a select temperature in response to monitored exhaust temperature values at the filtration system for adaptive temperature regulation thereof,
   wherein regulation of exhaust temperature at the filtration system promotes oxidation of the filter, such that health of the filter is maintained and emissions are reduced.

2. The exhaust aftertreatment system of claim 1, wherein the filtration system has an operational temperature range.

3. The exhaust aftertreatment system of claim 2, wherein the operational temperature range of the filtration system is between 240° C. and 650° C., and wherein the controller is adapted to signal the valve to deliver a select volume of exhaust to the burner and adapted to signal the burner to heat such select volume of exhaust to a select temperature to achieve an exhaust temperature at the filtration system within its operational temperature range.

4. The exhaust aftertreatment system of claim 2, wherein the select amount of fuel is zero when the temperature at the filtration system is outside its operational temperature range.

5. The exhaust aftertreatment system of claim 1, wherein the filtration system includes a diesel particulate filter.

6. The exhaust aftertreatment system of claim 5, wherein the filtration system further includes a diesel oxidation catalyst situated upstream of the diesel particulate filter, and the temperature of the filtration system is monitored at the outlet of the diesel oxidation catalyst.

7. The exhaust aftertreatment system of claim 5, wherein the filtration system includes a diesel oxidation catalyst situated upstream of the diesel particulate filter, and the temperature of the filtration system is measured at the inlet of the diesel oxidation catalyst.

8. The exhaust aftertreatment system of claim 1, wherein the temperature of the filtration system is measured at the diesel particulate filter.

9. The exhaust aftertreatment system of claim 1, further comprising a pressure differential sensor for monitoring and controlling pressure differential across the filter, and wherein the controller is adapted to signal the valve to deliver a select volume of exhaust to the heating device and adapted to signal the burner to heat such select volume of exhaust to a select temperature to achieve a temperature at the filtration system for reducing such pressure differential across the filter.

10. The exhaust aftertreatment system of claim 1, further comprising at least one pressure sensor situated at the manifold for measuring backpressure of the exhaust aftertreatment system, and wherein the controller is adapted to signal the valve to deliver a select volume of exhaust to the burner and adapted to signal the burner to heat such select volume of exhaust to a select temperature to achieve a temperature for reducing such backpressure.

11. The exhaust aftertreatment system of claim 1, further comprising at least one emissions sensor situated at an outlet the filtration system for monitoring emissions therefrom, and wherein the controller is adapted to signal the valve to deliver a select volume of exhaust to the burner and adapted to signal the burner to heat such select volume of exhaust to a select temperature to achieve a temperature for reducing emissions at such outlet.

12. The exhaust aftertreatment system of claim 1, further comprising a NOx reduction system having a select operational temperature range, and wherein the controller is adapted to signal the valve to deliver a select volume of exhaust to the burner and adapted to signal the burner to heat such select volume of exhaust to a select temperature to achieve a temperature within the operational temperature range of the NOx reduction system.

13. A method for reducing emissions in exhaust expelled from an engine of a locomotive having an exhaust aftertreatment system, wherein the exhaust aftertreatment system includes a manifold adapted to receive exhaust from the locomotive engine, a burner coupled to the engine for heating at least a portion of the exhaust entering the manifold, wherein the manifold is sized and shaped to promote mixing of the exhaust from the locomotive engine and the portion of heated exhaust from the burner, a filtration system coupled to the manifold including a catalyst and a filter adapted to filter particulate matter from the exhaust, the method comprising the steps of:

provinding exhaust from the locomotive engine to the manifold of the exhaust aftertreatment system, measuring exhaust temperature at the filtration system, adaptively delivering a select volume of exhaust from the locomotive engine to the burner, adaptively heating the select volume of exhaust delivered to the burner to a select temperature in response to exhaust temperature values measured for adaptive temperature regulation thereof, delivering the select volume of heated exhaust to the manifold, mixing the exhaust from the locomotive engine and the portion of heated exhaust within in the manifold, delivering the mixed exhaust to the filtration system, wherein regulation of exhaust temperature at the filtration system promotes oxidation of the filter, such that health of the filter is maintained and emissions are reduced, and adding fuel to the mixture of exhaust from the locomotive engine and the portion of heated exhaust, wherein the fuel and exhaust mixture reacts with oxygen in the presence of the catalyst to promote oxidation of soot on the filter.

* * * * *